United States Patent
Kafka et al.

(10) Patent No.: US 12,508,884 B1
(45) Date of Patent: Dec. 30, 2025

(54) OBJECT DETECTION IN AUTOMOTIVE APPLICATIONS

(71) Applicant: Zoox, Inc., Foster City, CA (US)

(72) Inventors: Connor Joseph Kafka, San Francisco, CA (US); Da Liu, Milpitas, CA (US)

(73) Assignee: Zoox, Inc., Foster City, CA (US)

( * ) Notice: Subject to any disclaimer, the term of this patent is extended or adjusted under 35 U.S.C. 154(b) by 588 days.

(21) Appl. No.: 17/934,864

(22) Filed: Sep. 23, 2022

(51) Int. Cl.
*B60J 5/04* (2006.01)
*E05F 15/75* (2015.01)
*G01V 3/08* (2006.01)

(52) U.S. Cl.
CPC .............. *B60J 5/047* (2013.01); *E05F 15/75* (2015.01); *G01V 3/08* (2013.01)

(58) Field of Classification Search
CPC ............. B60J 5/047; E05F 15/75; G01V 3/08
See application file for complete search history.

(56) References Cited

U.S. PATENT DOCUMENTS

| | | | | |
|---|---|---|---|---|
| 4,710,750 A * | 12/1987 | Johnson | ................ | G08B 29/183 340/567 |
| 5,836,639 A * | 11/1998 | Kleefeldt | ................ | E05B 81/76 49/213 |
| 5,925,858 A * | 7/1999 | Full | ................ | B66B 13/26 49/25 |
| 9,637,970 B1 * | 5/2017 | Rendon, Jr. | ............ | E06B 3/5054 |
| 10,386,226 B1 * | 8/2019 | Engelstein | .............. | E05F 15/40 |
| 11,359,430 B2 * | 6/2022 | Linden | .................... | E05B 83/38 |
| 2018/0038943 A1 * | 2/2018 | Ramasubramanian | ..................... | G01S 13/931 |
| 2019/0330026 A1 * | 10/2019 | Schmidt | .................. | B66B 13/26 |
| 2022/0410673 A1 * | 12/2022 | Kanasugi | ................ | E05B 83/40 |
| 2023/0193685 A1 * | 6/2023 | Hauri | ...................... | E05F 15/73 49/31 |
| 2023/0211978 A1 * | 7/2023 | Siman | ................... | B66B 1/3476 187/392 |
| 2023/0323724 A1 * | 10/2023 | Guevara Rosas | ......... | G01S 7/40 367/96 |

* cited by examiner

*Primary Examiner* — Marcus E Windrich
(74) *Attorney, Agent, or Firm* — EIP US LLP

(57) ABSTRACT

A vehicle comprises an object detection system, comprising: (A) a transmitter, (B) a receiver affixed, and (C) at least one processor configured to: (i) based on a characteristic of the environment in which the vehicle is currently located, determine an operating parameter of at least one of the transmitter and the receiver, (ii) cause the transmitter to output electromagnetic radiation with an intensity associated with the operating parameter of the transmitter, (iii) receive, from the receiver, a signal indicative of the electromagnetic radiation detected by the receiver, wherein the signal is based on the operating parameter of the receiver, (iv) determine that the transmission of the electromagnetic radiation between the transmitter and receiver is at least partially obstructed by an object based at least in part on the signal, and (v) control movement of a first and second door based at least in part on the electromagnetic radiation being obstructed.

20 Claims, 15 Drawing Sheets

OBJECT DETECTION IN AUTOMOTIVE APPLICATIONS

BACKGROUND

Autonomous and partially autonomous vehicles are increasingly being tested and used not only for convenience, but also to improve road safety. Autonomous vehicles may have a combination of different sensors that can be used to detect nearby objects to help the vehicle navigate through the environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
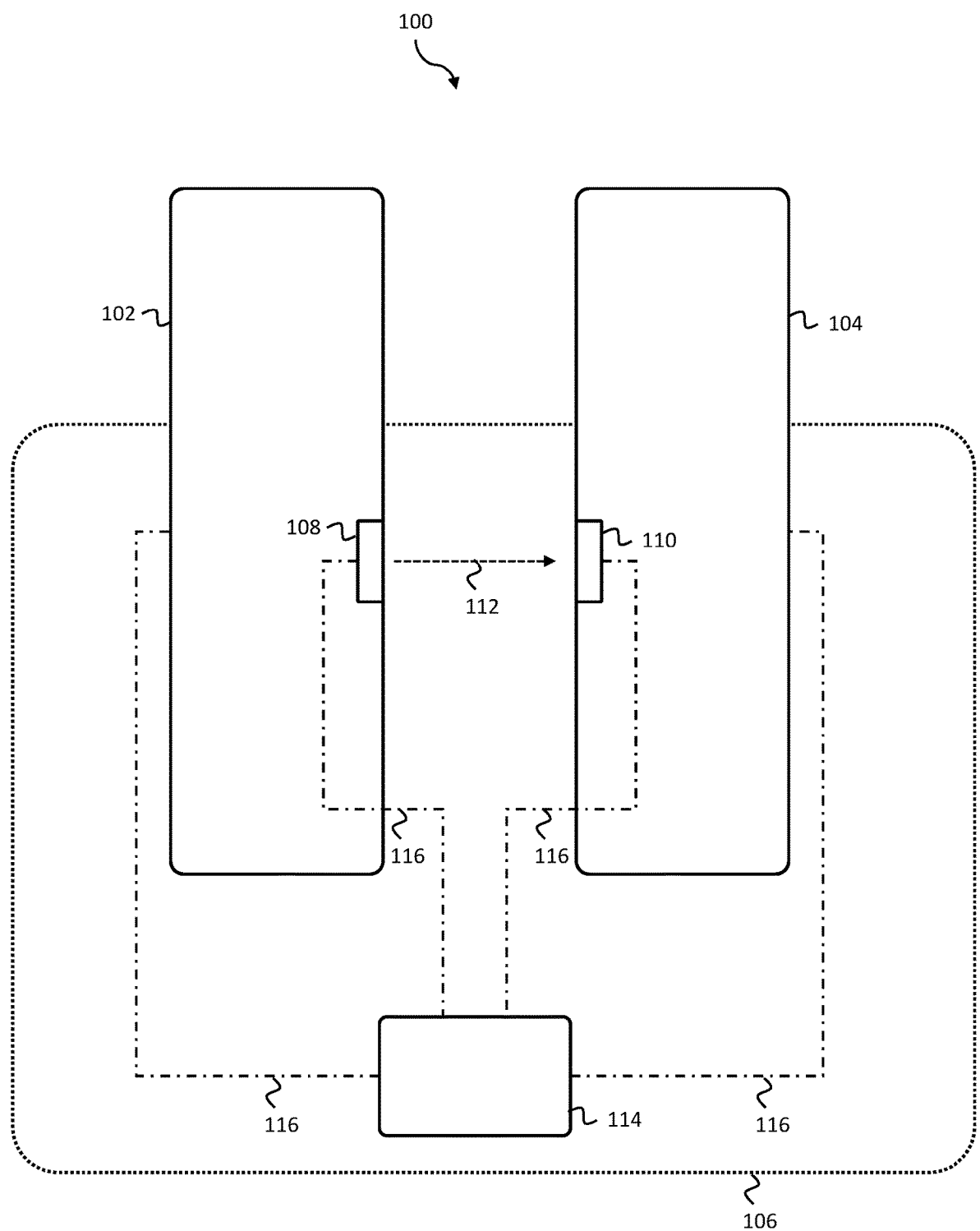
FIG. 1 is a block diagram of an object detection system of a vehicle, according to an example.

This application relates to vehicles, methods, computer-readable media and object detection systems for determining/detecting whether an object, such as human, is within the vicinity of an opening of the vehicle. For example, the vehicle may have one or more doors which can open and close and a human can enter and exit the vehicle via the opening when the one or more doors are open. The present application describes techniques regarding an object detection system of a vehicle having a transmitter and receiver (that can transmit and receive electromagnetic radiation, such as infrared). The object detection system can determine the presence of an object, and can responsively control the movement of one or more doors to stop the doors from closing on the object. The object detection system of this application can adapt to different environmental conditions experienced by the vehicle as it moves throughout an environment, such as a city. In particular, operating parameters of either or both the transmitter and receiver can be dynamically adjusted depending upon a characteristic of the environment. As will be explained in more detail below, this has benefits over conventional object detection systems that are static within the environment, and as such may not update or control their operating parameters to account for vehicle movements, for example.

The use of conventional object detection systems may be unsuitable for complex vehicle environments where local conditions can vary rapidly, unexpectedly and by a large amount. For example, conventional object detection systems may be unsuitable for use on vehicles due to the rapidly varying environmental conditions that a vehicle may be exposed to. For example, the vehicle may experience certain weather conditions that result in a receiver of an object detection system detecting a higher or lower intensity of electromagnetic radiation emitted by a transmitter than it otherwise would, which may be erroneously interpreted as a detection of an object. Not only is this inconvenient for a user (for example, a vehicle door may stay open longer than it needs to) but it may also be dangerous (for example, the door may close on a user while they are entering or exiting the vehicle).

To address these issues, the inventors have developed an object detection system for use on vehicles that adapts to different environments based on detected or inferred environmental conditions. As such, in examples, there is provided a vehicle comprising: (A) a first door and a second door, the first and second doors can be configured to move along non-linear paths relative to an opening of the vehicle to at least partially close the opening, wherein the first and second doors are moveable to opposite sides of the opening, and (B) an object detection system, comprising: a transmitter affixed to the first door and configured to emit electromagnetic radiation across the opening, a receiver affixed to the second door and configured to detect electromagnetic radiation emitted by the transmitter, and at least one processor communicatively coupled to the transmitter and receiver, the at least one processor can be configured to: (i) based on a characteristic of the environment in which the vehicle is currently located, determine an operating parameter of at least one of the transmitter and the receiver; (ii) cause the transmitter to output electromagnetic radiation with an intensity associated with the operating parameter of the transmitter; (iii) receive, from the receiver, a signal indicative of the electromagnetic radiation detected by the receiver, wherein the signal is based on the operating parameter of the receiver; (iv) determine that the transmission of the electromagnetic radiation between the transmitter and receiver is at least partially obstructed by an object based at least in part on the signal, and (v) control movement of the first and second doors based at least in part on the electromagnetic radiation being obstructed.

Such an object detection system may therefore determine an operating parameter of the transmitter and/or receiver based on the characteristic of the environment in which the vehicle is located. The transmitter and receiver may operate according to their respective determined operating parameters. For example, the intensity of the electromagnetic radiation output by the transmitter may be based on an operating parameter of the transmitter. The operating parameter of the transmitter may be known as a first operating parameter, in some examples. Similarly, the electromagnetic radiation detected by the receiver, and therefore the signal, may be based on an operating parameter of the receiver. The operating parameter of the receiver may be known as a second operating parameter, in examples. In some examples, only one of the first and second operating parameters may be determined. In other examples, both of the first and second operating parameters may be determined. In examples where only one operating parameter is determined, the other element (i.e., transmitter or receiver) may operate according to default operating parameter, or a previously determined operating parameter.

The operating parameter of the transmitter may be a power output level. As such, in examples, the at least one processor may be configured to determine the power output level of the transmitter based on a characteristic of the environment. For example, in brightly lit environments (i.e., those having a higher level of background electromagnetic radiation), the power output level of the transmitter may be increased to a sufficiently high level so that the electromagnetic radiation detected by the receiver can be distinguished from the background signal. Without such adaptive power output control, the system may not accurately detect when an object is positioned between the transmitter and receiver. Conversely, in dimly lit environments (i.e., those having a lower level of background electromagnetic radiation), the power output level of the transmitter may be decreased to a sufficiently low level so that the electromagnetic radiation does not saturate the receiver and/or dazzle a user or possibly even damage the eyes of a user. Furthermore, in electric vehicles (i.e., those powered by one or more batteries), reducing the power level of the transmitters may reduce power consumption.

The, or another, operating parameter of the transmitter may be a transmitter pulse repetition frequency or modulation of pulse width. For example, a transmitter may output electromagnetic radiation for a period of time before being turned off again for a second period of time or a proportion that the transmitter is active vs inactive.

The operating parameter of the receiver may be a receiver gain. As such, in examples, the at least one processor may be configured to determine the receiver gain of the receiver based on a characteristic of the environment. For example, in brightly lit environments, the receiver gain may be reduced to avoid oversaturating the receiver. Conversely, in dimly lit environments, the receiver gain may be increased to ensure that the electromagnetic radiation can be detected. Without such adaptive gain control, the system may not accurately detect when an object is positioned between the transmitter and receiver.

The, or another, operating parameter of the receiver may be a receiver frequency response. For example, a receiver may filter out signals with a pulse repetition frequency above and/or below a certain level. As an example, a receiver may detect background electromagnetic radiation having a specific pulse repetition frequency and may be operated to filter out such "noise" or interference having the specific pulse repetition frequency. Similarly, the transmitter may then be configured to output electromagnetic radiation having a particular pulse repetition frequency that is not filtered out (and therefore different to the specific pulse repetition frequency of the background noise). Setting such operating parameter(s) can allow background noise/interference to be filtered out.

Additional to or alternative to determining an operating parameter of the transmitter and/or receiver based on ambient lighting conditions (referred to herein as background electromagnetic radiation), the operating parameter(s) may be determined based on other environmental conditions, such as the weather. For example, a vehicle may move from dry to wet conditions on rainy days, or from smoky or steamy environments to more clear environments. Other characteristics of the environment may therefore include: (i) a state of the weather, including a state of precipitation, (ii) temperature, (iii) humidity, (iv) visibility, etc.

Accordingly, the object detection system described herein can adapt based on one or more characteristics of the environment, thereby having improved operation, safety and power consumption compared to existing object detection systems.

In examples, the characteristic of the environment may be directly measured or otherwise detected or determined by a sensor. The sensor may be the receiver of the object detection system, in some examples. In examples, the characteristic of the environment may be received by the vehicle from an external source, such as a remote computing device.

In examples, the characteristic of the environment may be inferred from a parameter, such as a vehicle location or a timestamp. For example, the vehicle may comprise a location sensor to determine a location of the vehicle, and the at least one processor may be configured to determine the location of the vehicle based on location data measured by the location sensor and determine characteristic of the environment based on the location. An example location may be in a vehicle garage, underground parking lot, under a bridge, etc. Additionally, or alternatively the at least one processor may be configured to determine characteristic of the environment based on a timestamp, such as the time of day.

In examples, the vehicle may be an electric vehicle comprising a battery, and the transmitter may be powered by the battery.

In examples, the object detection system may determine/detect whether/that an object is within the vicinity of an opening of a vehicle. In examples, the object detection system may determine/detect whether/that an object obstructs the opening and/or whether/that an object obstructs movement of one or more doors of the vehicle. The opening may be for entering and exiting the vehicle and/or allowing packages or other items to be loaded or unloaded from the vehicle.

In examples, the receiver is configured to generate a signal indicative of an intensity of electromagnetic radiation detected by the receiver.

More detailed examples of the vehicle, as well as method(s) and computer-readable media of the present disclosure will now be presented, with reference to the accompanying figures.

FIG. 1 depicts an example of some components of a notional vehicle 100 including features of this disclosure. It will be appreciated that the vehicle 100 may comprise other components additional to those shown in FIG. 1. The vehicle 100 of this example has a first door 102 and a second door 104, and the first and second doors 102, 104 can move along two separate paths relative to an opening of the vehicle 100 to at least partially close the opening. For example, the first and second doors 102, 104 may move along non-linear paths. In a particular example, the first and second doors 102, 104 can move generally in opposite directions to each other, such that the opening is between the first and second doors 102, 104 when the first and second doors 102, 104 are in an open position. As mentioned, the opening provides ingress to and egress from the vehicle 100. In other examples, there may be one or more doors that close the opening.

Figure 2A:
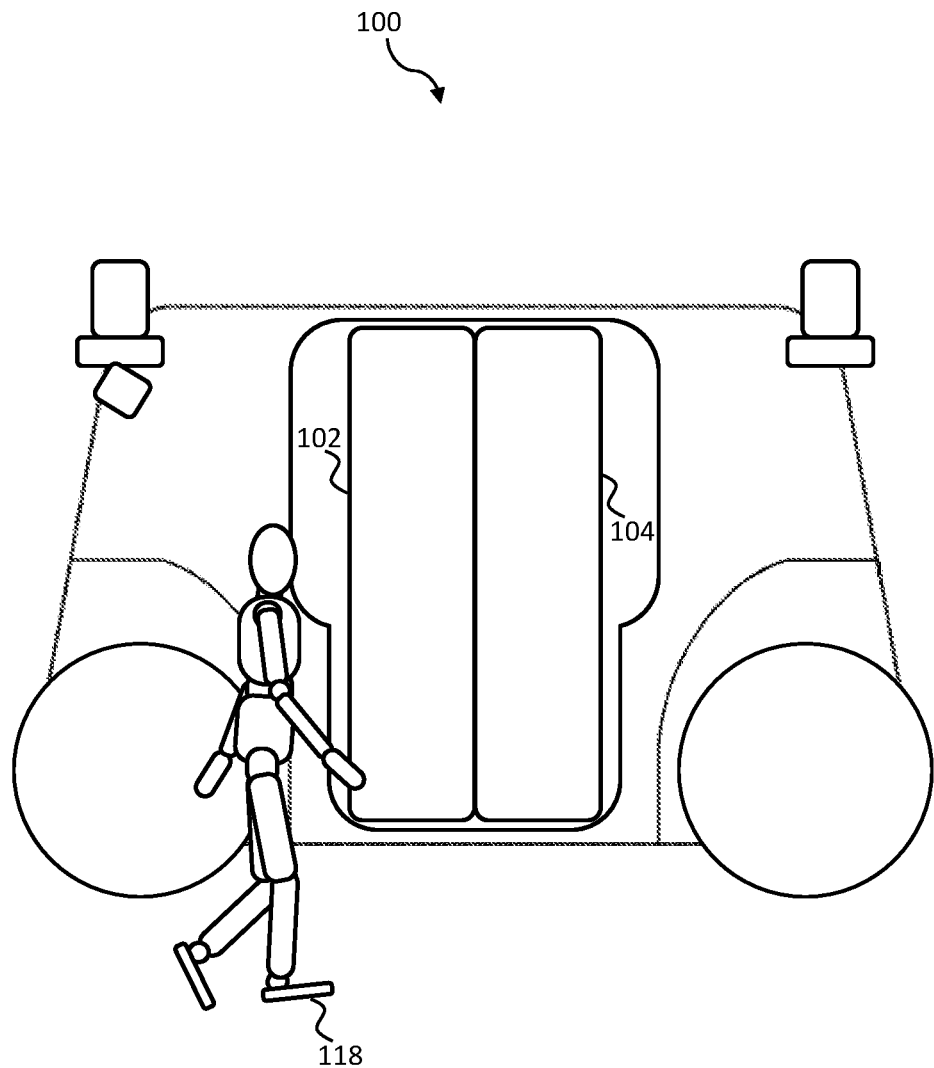
FIGS. 2A-2C are pictorial diagrams of an example vehicle showing the movement of two vehicle doors.
Figure 2B:
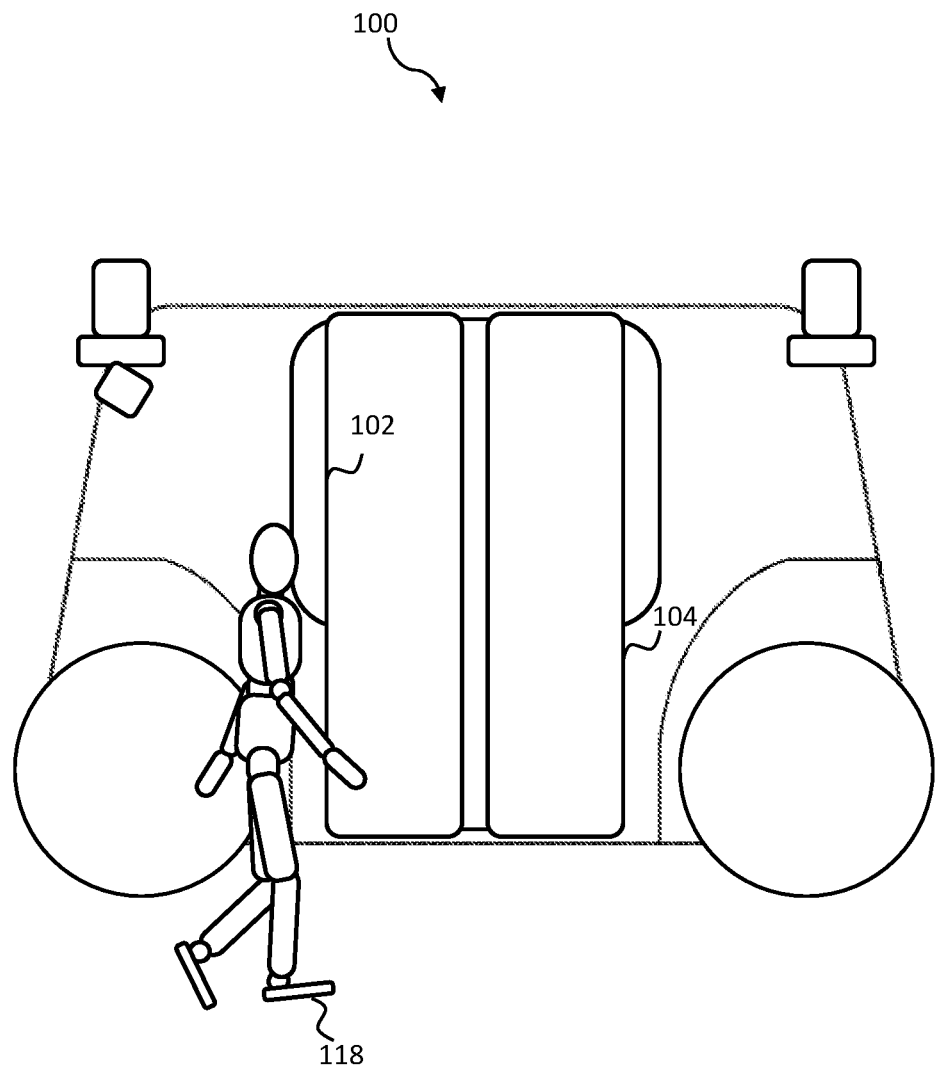
Figure 2C:
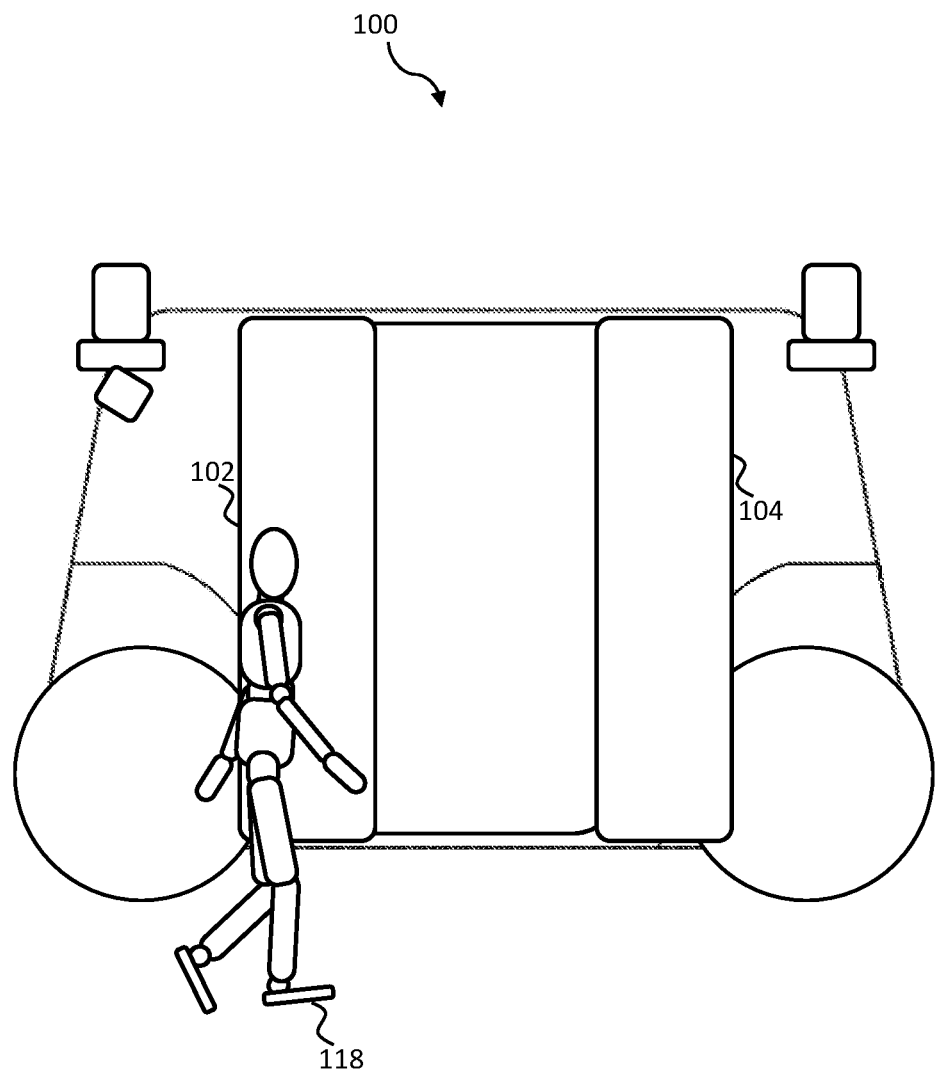

In the example of FIG. 1, the doors 102, 104 are shown in an open position; that is the doors are spaced apart by a gap. FIGS. 2A-2C depict the exterior of the vehicle 100. In FIG. 2A, the doors 102, 104 are shown in a closed position, such that there is no longer a gap between the doors 102, 104. In FIG. 2B, the doors 102, 104 are shown partially open as they move from the closed position towards an open position. FIG. 2C shows the doors 102, 104 in an open position, and the first and second doors 102, 104 are located on opposite sides of the opening. The doors can therefore move between the open positions of FIGS. 1 and 2C, and the closed position of FIG. 2A. FIGS. 2A-2C also depict an object, such as a human 118 who may wish to gain entry to the vehicle 100 via the opening.

Returning to FIG. 1, the vehicle 100 may further comprise an object detection system 106, comprising a transmitter 108 affixed to the first door 102, and a receiver 110 affixed to the second door 104. The transmitter 108 can be configured to emit electromagnetic radiation 112 across the opening of the vehicle and towards the receiver 110. The transmitter 108 and receiver 110 can therefore be arranged relative to each other such that the transmitter 108 can emit electromagnetic radiation 112 across the opening of the vehicle 100 and towards the receiver 110 for detection by the receiver 110.

The object detection system 106 may further comprise at least one processor 114 communicatively coupled to the transmitter 108 and receiver 110 (via one or more wired or wireless connections 116). The at least one processor 114 may further be communicatively coupled to the first and second doors 102, 104 to cause movement of the first and second doors 102, 104. For example, at least one processor forming the at least one processor 114 may be part of a door movement system (not shown) that can facilitate and cause movement of the doors 102, 104 along their respective paths between the open and closed positions.

The vehicle 100 may further include one or more non-transitory computer readable media (not shown) storing instructions executable by the one or more processors 114. The vehicle 100 may be an autonomous vehicle, for example.

For brevity, herein, "the at least one processor" will be replaced by the term "the processor". It will be appreciated therefore that any reference to "the processor" will be replaceable by "the at least one processor".

Furthermore, although the example of FIG. 1 includes two doors, it will be understood that the following discussion can apply to example vehicles comprising at least one door to close the opening. In examples having just one door, one of the transmitter or receiver may be affixed to the door and the other of the transmitter or receiver may be affixed elsewhere on the vehicle 100, such as to a body of the vehicle 100. In some examples, neither the transmitter nor the receiver are affixed to the door(s). For example, both may be affixed to the vehicle 100, such as the body of the vehicle 100.

In examples, such as the one of FIG. 1, the processor 114 may be configured to determine an operating parameter of at least one of the transmitter 108 or the receiver 110 based on a characteristic of the environment in which the vehicle 100 is currently located. For example, the processor 114 may determine a characteristic of the environment, such as the intensity of the background electromagnetic radiation (determined at a time when the transmitter 108 is not emitting electromagnetic radiation). This background "level" can be used by the processor 114 to determine an operating parameter of the transmitter and/or an operating parameter of the receiver.

In the example of FIG. 1, the characteristic of the environment may be determined based on electromagnetic radiation detected by the receiver. That is, the receiver 110 itself may be used to determine the characteristic. Use of the receiver 110, rather than use of a separate sensor, reduces the number of components required to provide an adaptive object detection system and can also overcome any systematic error within the system. Systematic error can be reduced because the receiver 110 is used to both: (i) initially detect the characteristic of the environment (such as background electromagnetic radiation), and (ii) later detect a measurement signal containing electromagnetic radiation from the transmitter 108 and background electromagnetic radiation. As such, when the measurement signal is processed to remove/subtract the background electromagnetic radiation, any predictable and consistent error in the receiver measurements will be cancelled out. In examples, the receiver 110 may be configured to detect the background electromagnetic radiation before the transmitter 108 emits electromagnetic radiation. The processor 114 may then receive, from the receiver 110, a signal indicative of the background electromagnetic radiation detected by the receiver 110. For example, the signal may indicate or be used to determine the intensity of the background electromagnetic radiation. Based on this received signal, the processor 114 can determine an operating parameter of at least one of the transmitter 108 and the receiver 110. For example, by reference to a look-up-table, the processor 114 may determine an operating parameter of the transmitter 108 and/or receiver 110 based on the signal (such as the intensity of the background electromagnetic radiation). In examples, an average intensity may be determined based on the signal.

As mentioned, an operating parameter of the transmitter 108 may be a power output level, for example. Accordingly, the processor 114 may determine the power output level of the transmitter 108 based on the background electromagnetic radiation and cause the transmitter 108 to operate according to the power output level. That is, when required to do so, the transmitter 108 may output electromagnetic radiation with an intensity associated with the power output level.

As also mentioned, an operating parameter of the receiver 110 may be a receiver gain, for example. Accordingly, the processor 114 may determine the receiver gain based on the background electromagnetic radiation and cause the receiver 110 to operate according to the receiver gain. Thus, any electromagnetic radiation detected by the receiver 110 may have a signal based on the receiver gain.

In another example, the background electromagnetic radiation signal detected by the receiver 110 may indicate or be used to determine an interference/noise pulse repetition frequency. For example, a source of interference may output electromagnetic radiation with a first pulse repetition frequency. This may be determined by analyzing the background electromagnetic radiation detected by the receiver 110 (for example, performing a Fourier Transform of the signal) and determining that the background electromagnetic radiation has the first pulse repetition frequency. Based on this received signal, the processor 114 can determine an operating parameter of at least one of the transmitter 108 and the receiver 110. For example, the processor 114 may determine a receiver frequency response (i.e., an operating parameter of the receiver 110) and cause the receiver 110 to operate to filter out electromagnetic radiation having the first pulse repetition frequency (such as filter out electromagnetic radiation below or above a certain pulse repetition frequency that includes the first pulse repetition frequency).

The processor 114 may additionally or alternatively determine a second pulse repetition frequency of the transmitter 108 (i.e., an operating parameter of the transmitter 108) and cause the transmitter 108 to operate to output electromagnetic radiation having the second pulse repetition frequency (the second pulse repetition frequency being different from the first pulse repetition frequency). Accordingly, signals with the first pulse repetition frequency may be filtered out by the receiver 110 or processor 114, whereas signals with the second pulse repetition frequency may not be filtered out (and therefore used to determine whether an object is within the vicinity of the opening).

In other examples, the receiver 110 may not be used to determine the characteristic of the environment. For example, a separate sensor may be located elsewhere on the vehicle that is used to determine the characteristic. In some examples, both the receiver 110 and a separate sensor may be used to determine one or more characteristics of the environment which are used to determine the operating parameter(s).

Once an operating parameter of the transmitter 108 and/or receiver 110 have been determined, the processor 114 may then cause the transmitter 108 to output electromagnetic radiation. For example, the transmitter 108 may output electromagnetic radiation with an intensity associated with a power output level and/or output electromagnetic radiation with a particular pulse operating frequency. The transmitter 108 may emit the electromagnetic radiation towards the receiver 110, which may be received by the receiver 110. The receiver may generate a signal indicative of an intensity of electromagnetic radiation detected by the receiver. The signal may be based on the current receiver gain of the receiver 110 and/or the receiver frequency response.

Assuming the path between the transmitter 108 and receiver 110 is not obstructed by an object (such as a human 118), the detected electromagnetic radiation may be a combination of any background electromagnetic radiation and electromagnetic radiation received from the transmitter 108. The processor 114 may then receive, from the receiver 110, the signal indicative of the electromagnetic radiation detected by the receiver 110 and may determine that the transmission of the electromagnetic radiation between the transmitter 108 and receiver 110 is not obstructed based on the signal. For example, the processor may determine a background subtracted intensity of electromagnetic radiation and compare this to a threshold. If the intensity is greater than the threshold, the processor 114 may determine that there is no object obstructing the transmission between the transmitter 108 and receiver 110. The processor 114 may then control movement of the first and second doors 102, 104 based on the determination that there is no obstruction. For example, the processor 114 may cause the doors 102, 104 to close or may continue to allow the doors 102, 104 to close if they are already in motion.

For example, the intensity of electromagnetic radiation detected by the receiver 110, may be given by: $I_r(G)=I_b+I_t(P)$, where $I_r(G)$ is the intensity of electromagnetic radiation detected by the receiver 110 (which may be based on the receiver gain, G), $I_b$ is the intensity of background electromagnetic radiation determined by the receiver 110 and $I_t(P)$ is the intensity of electromagnetic radiation received from the transmitter (which may be based on the transmitter output power level, P). In some examples, $I_t(P)$ may also be based on the distance between the transmitter 108 and receiver 110. Accordingly, if $I_r(G)-I_b \geq T$, where T is a threshold level, the processor 114 may determine that there is no object obstructing the transmission between the transmitter 108 and receiver 110. The background $I_b$ may be the background measurement performed earlier when the operating parameter(s) were determined. In examples, $I_b$ may also be dependent on the receiver gain, G. As such, the processor 114 may determine that the intensity of electromagnetic radiation detected by the receiver 110 has not reduced by an amount greater than the threshold level, thereby determining that the transmission of the electromagnetic radiation between the transmitter 108 and receiver 110 is not obstructed by an object.

In examples where there is an object positioned between the transmitter 108 and receiver 110, the electromagnetic radiation detected by the receiver 110 may comprise background electromagnetic radiation. This would be the case when the object fully obstructs the transmission of the electromagnetic radiation between the transmitter 108 and receiver 110. For example, the intensity of electromagnetic radiation detected by the receiver 110, may be given by: $I_r(G)=I_b$.

In certain examples however, the object may partially obstruct the transmission of electromagnetic radiation between the transmitter 108 and receiver 110. In such a case, the detected electromagnetic radiation may be a combination of any background electromagnetic radiation and electromagnetic radiation received from the transmitter 108, where the contribution from the transmitter 108 is less than if the object were not present. For example, the intensity of electromagnetic radiation detected by the receiver 110, may be given by: $I_r(G)=I_b+\alpha I_t(P)$, where $\alpha$ is a scaling factor greater than 0 and less than 1 due to partial obstruction of the electromagnetic radiation by the object and $I_t(P)$ is the intensity of electromagnetic radiation that would have been received from the transmitter if the object were not present.

In both cases, the processor 114 may then receive, from the receiver 110, a signal indicative of the electromagnetic radiation detected by the receiver 110 and may then determine that the transmission of the electromagnetic radiation between the transmitter 108 and receiver 110 is at least partially obstructed based on the signal. For example, the processor 114 may determine a background subtracted intensity of electromagnetic radiation and compare this to a threshold level. If the intensity is less than the threshold (such as $I_r(G)-I_b \leq T$) the processor 114 may determine that there is an object obstructing the transmission between the transmitter 108 and receiver 110. As such, the processor 114 may determine that the intensity of electromagnetic radiation detected by the receiver 110 reduces by an amount greater than the threshold level, thereby determining that the transmission of the electromagnetic radiation between the transmitter 108 and receiver 110 is at least partially obstructed by the object.

The processor 114 may then control movement of the first and second doors 102, 104 based on the determination that there is an obstruction. For example, the processor 114 may cause the doors 102, 104 to stay in an open position, or if they are currently closing, cause them to open again.

Accordingly, as a result of determining and/or adjusting or otherwise updating the operating parameter(s) based on a characteristic of the environment (in this case the background electromagnetic radiation), the object detection system 106 may operate more effectively in the environment in which the vehicle 100 is currently located. Without this dynamic operation, the system 106 may not be as accurate at determining whether an object obstructs the transmission of electromagnetic radiation.

In some examples, the threshold level, T, is based on the characteristic of the environment. The threshold may change over time. Accordingly, in examples, the processor 114 may determine the threshold based on a characteristic of the environment. For example, the processor 114 may determine the threshold level based on the background electromagnetic radiation detected previously. The threshold level may be determined periodically.

As mentioned, in some examples, the first and second doors 102, 104 may move in a non-linear fashion along non-linear paths. That is, rather than moving/translating along one dimension, the doors 102, 104 may along a two- or three-dimensional path. To illustrate this non-linear motion, FIGS. 3A-3C will be referred to.

Figure 3A:
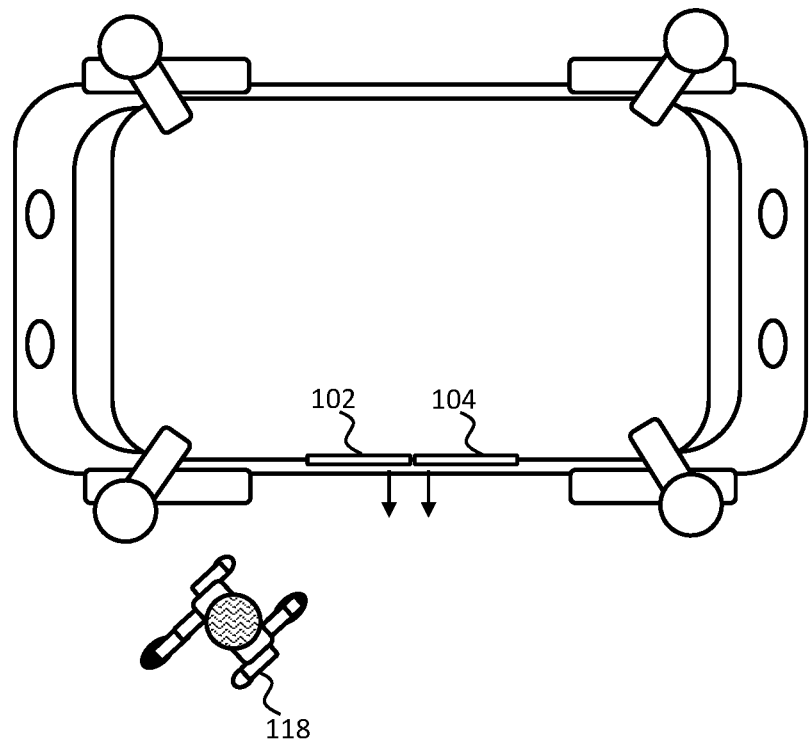
FIGS. 3A-3C are top-down views of the example vehicle shown in FIGS. 2A-2C.
Figure 3B:
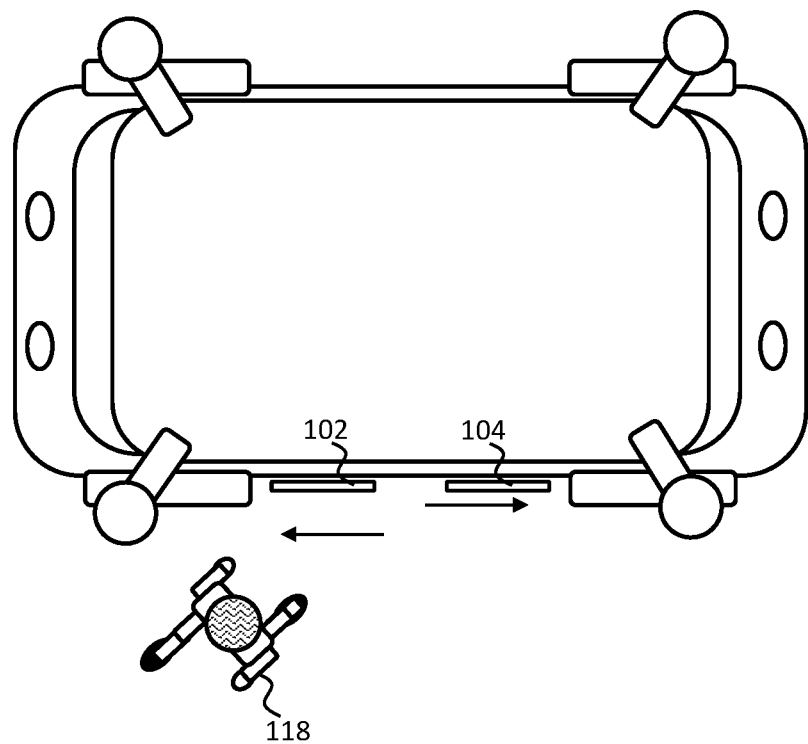
Figure 3C:
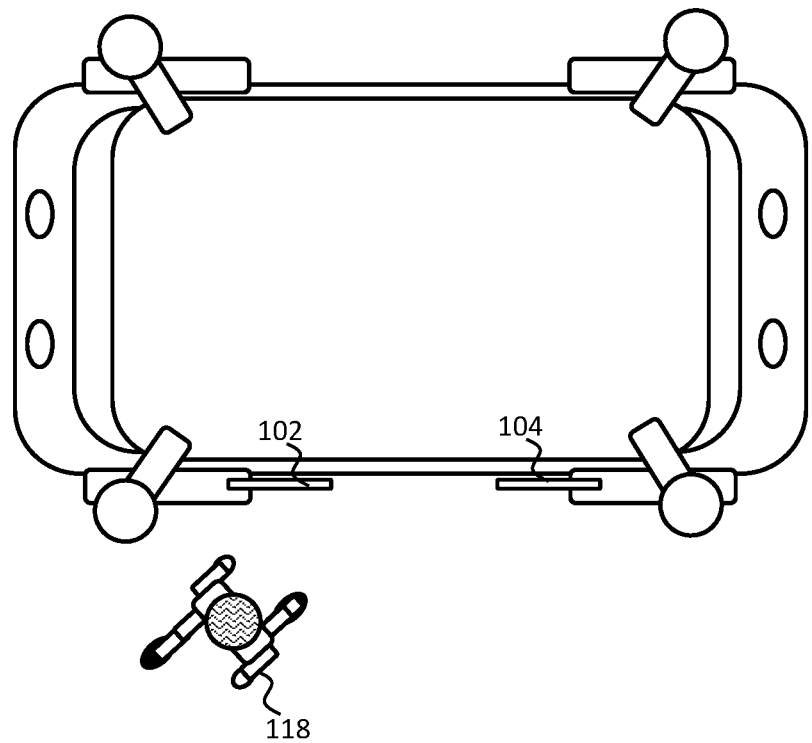

FIG. 3A depicts a top-down view of the vehicle 100 shown in FIG. 2A. Here the doors 102, 104 are shown in a closed position and close the opening of the vehicle 100. In this configuration, the doors are flush with the side of the vehicle. FIG. 3B depicts a top-down view of the vehicle 100 shown in FIG. 2B. Here the doors 102, 104 are shown partially open as they are moving towards the open position. In this configuration, the doors 102, 104 are no longer flush with the side of the vehicle 100 and have instead moved outwards and away from the side of the vehicle 100 (and opening) when compared to the position shown in FIG. 3A. The doors 102, 104 may therefore move in a direction substantially outwards and away from the opening. FIG. 3C depicts a top-down view of the vehicle 100 shown in FIG. 2C. Here the doors 102, 104 are shown fully open and therefore in the open position. As in FIG. 3B, in this configuration, the doors 102, 104 are not flush with the side of the vehicle 100 and have instead moved along linear paths parallel to the side of the vehicle from the position in FIG. 3B. The doors 102, 104 may therefore move in a direction on a plane that is parallel to a plane defined by the opening. As such, the full path taken by each door 102, 104 as it moves from the closed position to the open position is non-linear. In this particular example, the paths taken by each door are two dimensional.

Figure 4A:
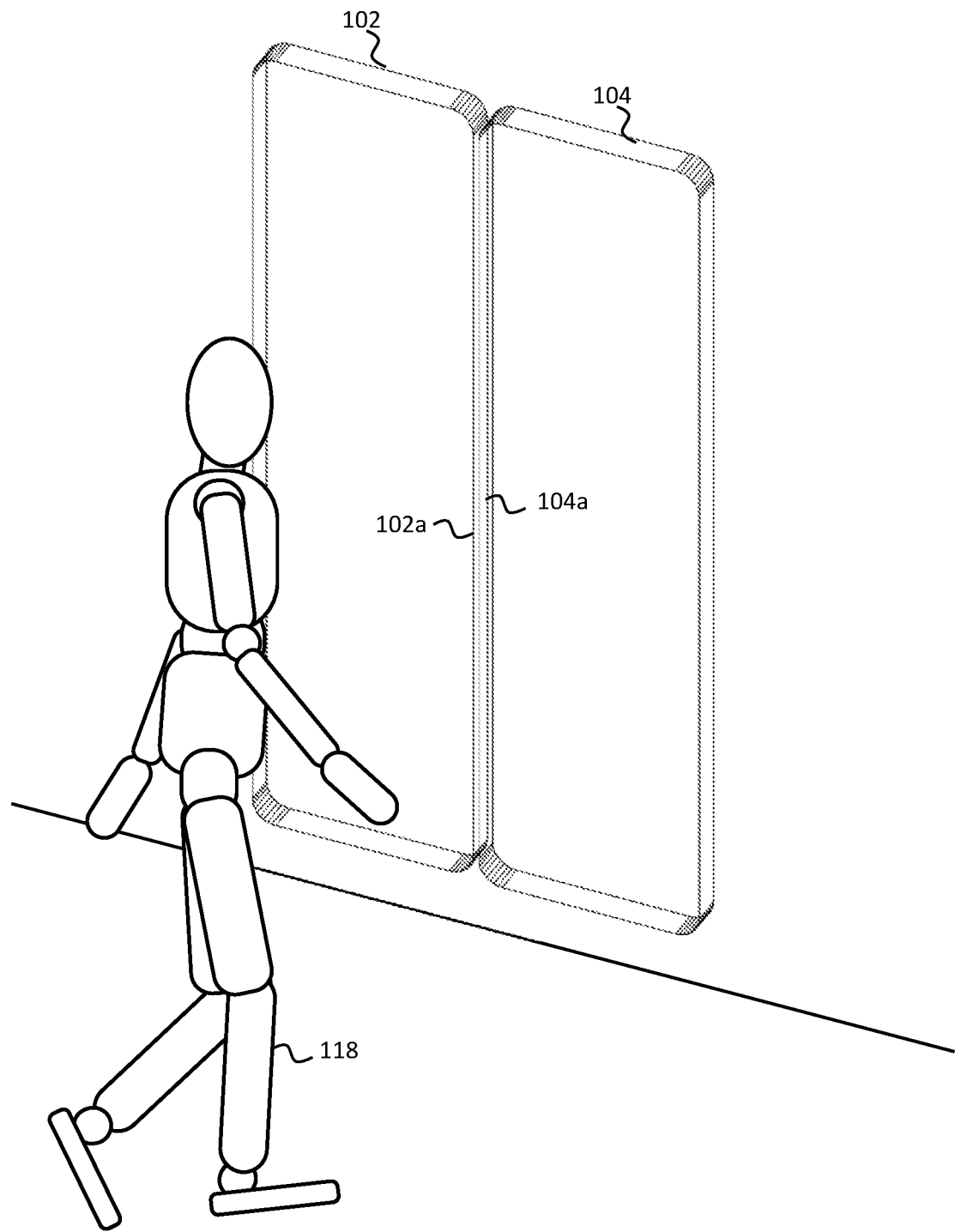
FIGS. 4A-4C are perspective diagrams showing the movement of two vehicle doors.
Figure 4B:
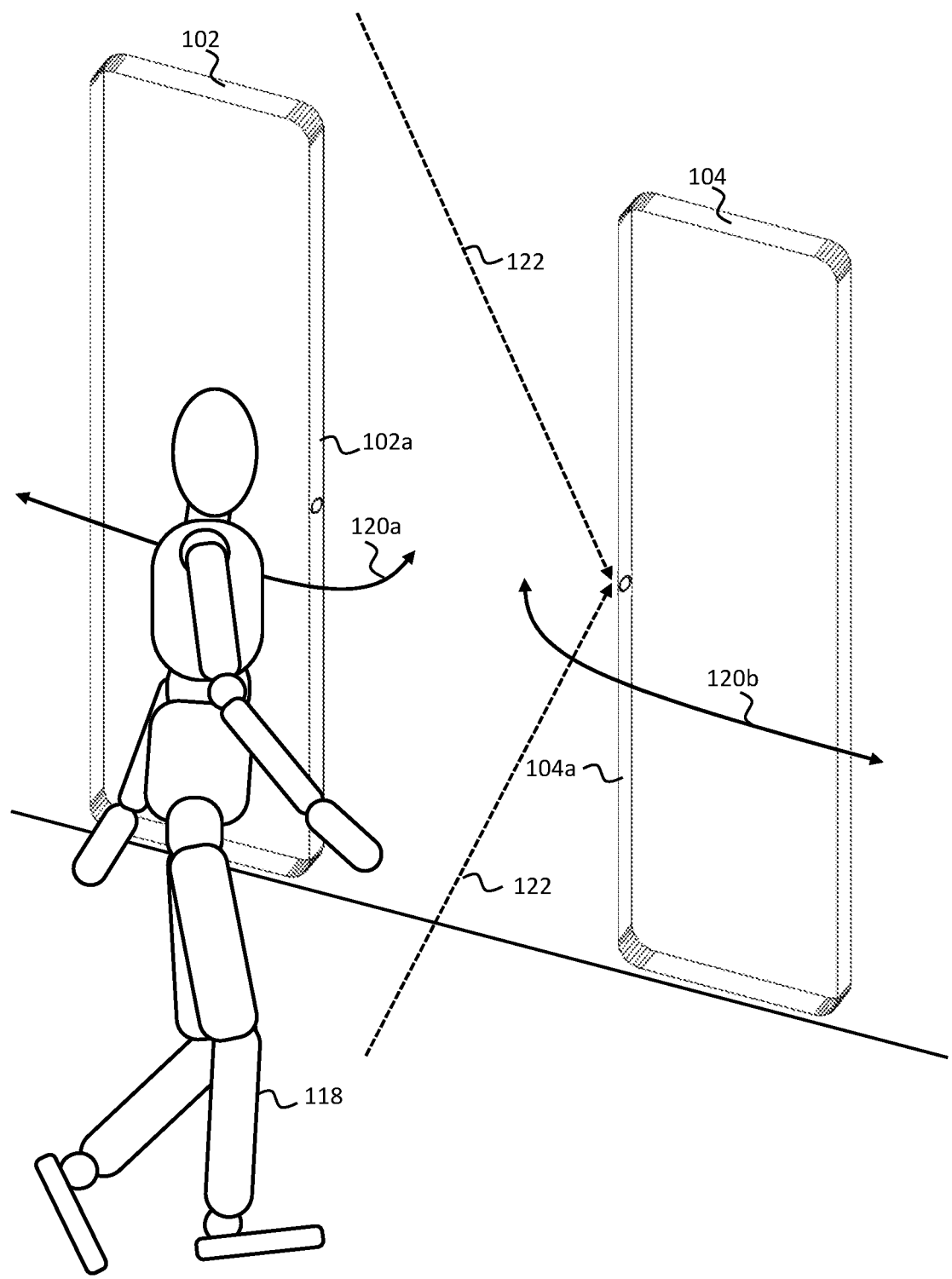
Figure 4C:
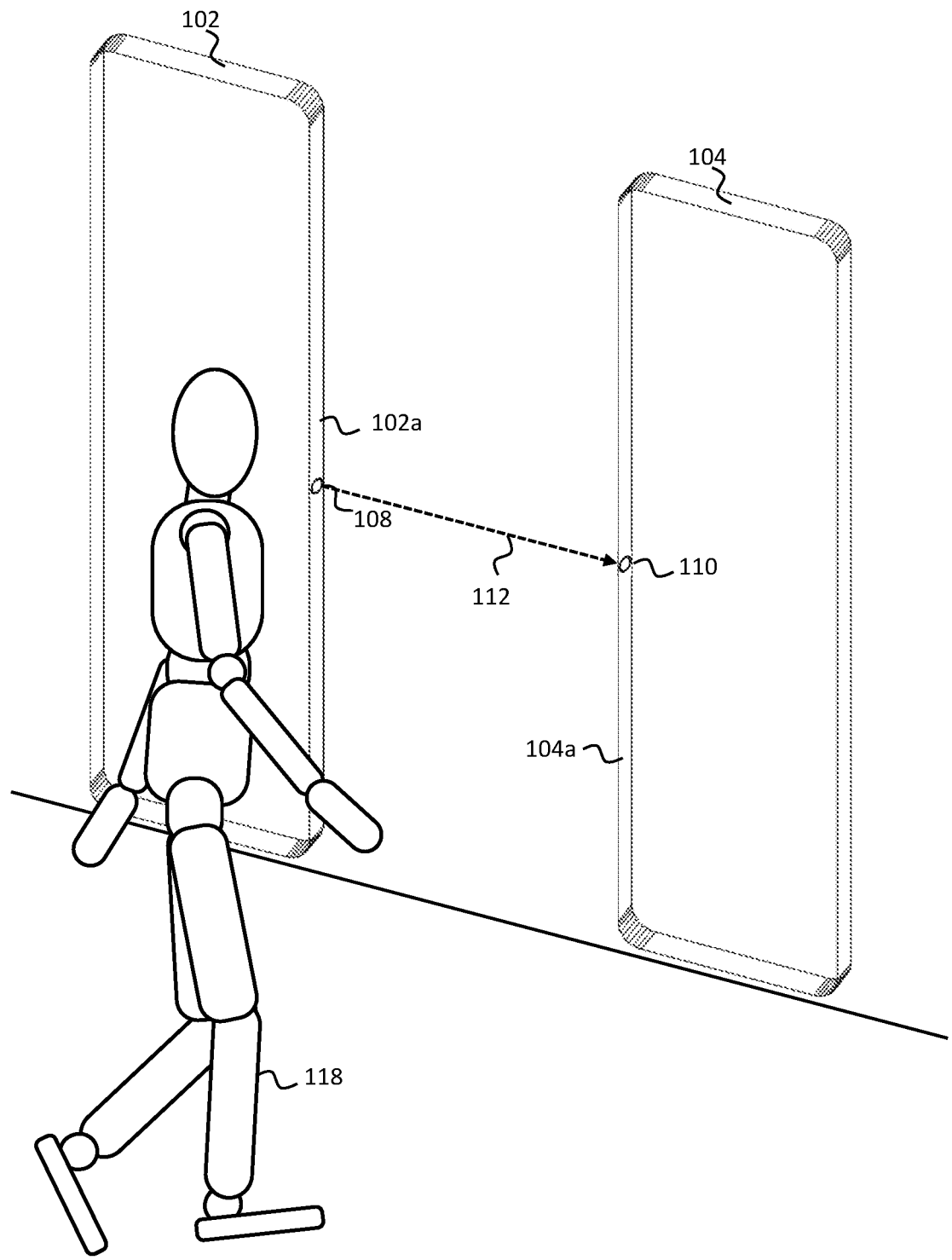

FIG. 4A depicts a perspective view of the vehicle 100 shown in FIGS. 2A and 3A. Here the doors 102, 104 are shown in a closed position. In this configuration, inside edges 102*a*, 104*a* of the doors 102, 104 are in abutment. FIG. 4B depicts a perspective view of the vehicle 100 shown in FIGS. 2C and 3C. Here the doors 102, 104 are shown fully open and therefore in the open position. FIG. 4C also depicts a perspective view of the vehicle 100 in which the doors 102, 104 are fully open and in the open position, but at a later time to that shown in FIG. 4B. FIG. 4B depicts the non-linear paths 120*a*, 120*b* taken by the doors 102, 104 as they move between the closed and open positions.

In the examples of FIG. 4A-4C, the transmitter 108 may be located on the inside edge 102*a* of the first door 102 and the receiver 110 may be located on the inside edge 104*a* of the second door 104. In other examples (not shown) the transmitter 108 and receiver 110 may be located elsewhere, on suitable portions of the vehicle 100 such that signals transmitted by the transmitter 108 may be received by the receiver 110. Regardless of the exact positioning, the transmitter 108 is arranged to emit electromagnetic radiation across the opening of the vehicle 110 and towards the receiver 110.

In examples where the transmitter 108 is arranged on the first door 102 and the receiver 110 is arranged on the second door, the transmitter 108 and receiver 110 may remain aligned while the doors are in motion so that the receiver 110 can receive the electromagnetic radiation transmitted by the transmitter 108. For example, if one door were to move at a different rate and/or at a later time to the other door, the radiation detected by the receiver 110 may vary to the extent that this may be interpreted as an obstruction by an object. As such, in examples, the processor 114 may be configured to control relative movement of both the first and second doors 102, 104 such that the transmitter 108 and receiver 110 are aligned while the first and second doors 102, 104 are in motion, thereby allowing the electromagnetic radiation emitted by the transmitter 108 to be received and detected by the receiver 110. In examples, this control may occur as the doors are being moved from the open position to the closed position. Controlling relative motion might involve controlling the rate or motion and/or synchronizing when the doors are caused to move. In examples, the electromagnetic radiation detected by the receiver 110 may be used to determine whether the doors are aligned, and the processor 114 may use the detected electromagnetic radiation to control movement of the doors 102, 104. For example, if the intensity of the received electromagnetic radiation reduces, it may be determined that the doors 102, 104 are moving out of alignment, and an adjustment to the movement of one or both of the doors 102, 104 may be made to bring the doors 102, 104 back into alignment. As such, the processor 114 may be configured to cause the receiver 110 to detect electromagnetic radiation (transmitted by the transmitter 108) while the first and second doors are in motion, and then control relative movement of both the first and second doors based on an intensity of the electromagnetic radiation detected by the receiver while the first and second doors are in motion.

It will be appreciated that this alignment control may be required over a portion of the paths taken by the doors. For example, this control may occur when the object detection system 106 is actively determining whether an object is located between the transmitter 108 and receiver 110. In some examples, when the doors are very close it may be assumed that no object is between the doors, so the door control may be less synchronized and/or any determination that an object obstructs the transmission may be assumed to be due to misalignment of the transmitter 108 and receiver 110 rather than a true obstruction by an object.

At a first time (shown in FIG. 4B), the receiver 110 may be caused to detect background electromagnetic radiation of the environment in which the vehicle 100 is located. As previously discussed, this measurement may be used to determine an operating parameter of at least one of the transmitter 108 and the receiver 110, and/or may be used to determine whether an object is located between the transmitter 108 and receiver 110. In this example, the process of measuring the background intensity may occur while the doors are in the open position. However, in other examples, this process may occur while the doors are moving from the closed position to the open position. If the receiver 110 is not used to determine the characteristic of the environment (for example, a different sensor is used, or data indicative of the characteristic is received from a remote server or second vehicle or mobile computing system), the characteristic may be determined at any time. In other examples, the separate sensor (and/or receiver 110) may operate to determine the characteristic each time the doors are opened, perhaps periodically (such as before each time the transmitter 108 is operated).

At a second, later time (shown in FIG. 4C), the transmitter 108 is caused to output the electromagnetic radiation 112 towards the receiver 110. As mentioned, should an object such as the human 118 obstruct the transmission, the processor 114 may determine that an object is located within the vicinity of the opening of the vehicle 110 and may responsively control movement of the first and second doors 102, 104. Accordingly, the process of determining an operating parameter of at least one of the transmitter 108 and the receiver 110 based on a characteristic of the environment may occur prior to causing the transmitter 108 to output electromagnetic radiation towards the receiver 110. In examples, the transmitter 108 may emit the electromagnetic radiation while the door is in the open position. In other examples, the transmitter 108 may emit the electromagnetic radiation while the door is moving from the open position to the closed position, or shortly before being caused to move to the closed position. In further examples, the transmitter 108 may emit the electromagnetic radiation while the door is in the open position and while the door is moving from the open position to the closed position.

The process of determining the characteristic(s) of the environment may occur periodically, such as at different times of the day, and/or when the location of the vehicle changes and/or at regular or irregular intervals. As such, the processor 114 may be configured to periodically determine an operating parameter of at least one of the transmitter 108 and receiver 110 based on the characteristic.

In a particular example, the processor 114 may determine the characteristic and/or determine the operating parameter(s) each time the door(s) are caused to open. That is, the processor 114 may be configured to perform a door opening and closing operation, in which the first and second doors are caused to open and then close (i.e., move between the closed position to the open position and then back to the closed position), and the processor 114 may be configured to determine an operating parameter of at least one of the transmitter 108 and the receiver 110 during each door opening and closing operation. That is, each time the door(s) move between the closed position to the open position and then back to the closed position the processor 114 may determine the characteristic and/or determine the operating parameter(s).

Figure 5:
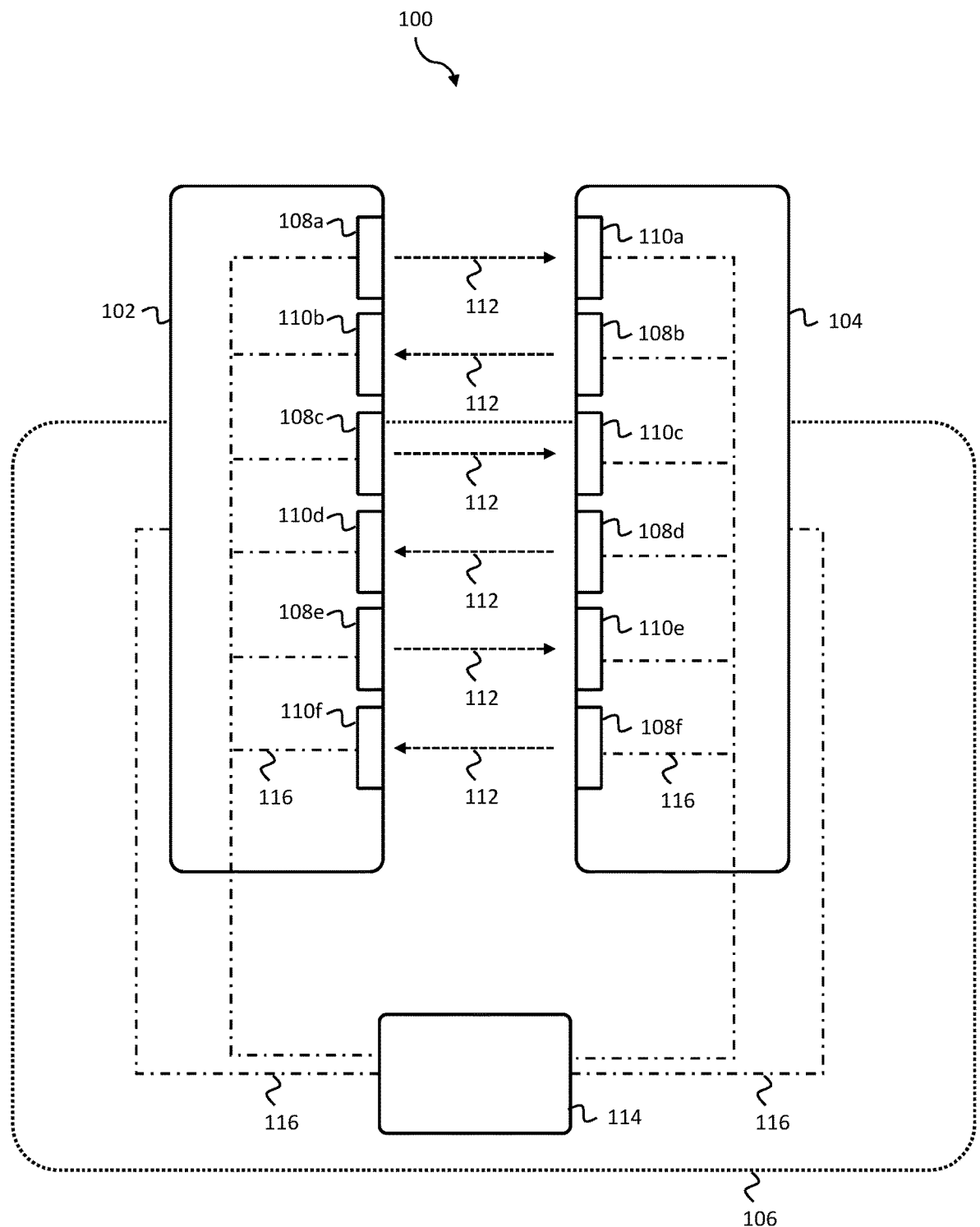
FIG. 5 is a block diagram of an object detection system of a vehicle comprising a plurality of transmitter/receiver pairs according to an example.

In examples, the transmitter 108 and receiver 110 may form a first transmitter/receiver pair of a plurality of transmitter/receiver pairs. FIG. 5 depicts an example in which the object detection system 106 comprises a plurality of transmitter receiver pairs, each transmitter/receiver pair having a transmitter 108a-f and corresponding receiver 110a-f. The transmitters 108a-f and receivers 110a-f within a transmitter/receiver pair may be configured to transmit and detect electromagnetic radiation within their own pair. For example, the transmitters 108a-f may have a sufficiently narrow beamwidth and/or the spacing between adjacent pairs may be sufficiently wide and/or the transmitters 108a-f and receivers 110a-f may be operated in a time-multiplexed fashion to ensure that a receiver 110a-f receives electromagnetic radiation from the corresponding transmitter 108a-f within the pair.

The use of a plurality of transmitters 108a-f and receivers 110a-f may improve safety. For example, the transmitters 108a-f and receivers 110a-f may be distributed at different locations along the inner edges 102a, 104a of the doors 102, 104 to detect objects at varying heights. Accordingly, the process of determining that the transmission of the electromagnetic radiation between the transmitter and receiver is at least partially obstructed may comprise determining that the transmission of the electromagnetic radiation is obstructed between any transmitter and receiver of the plurality of transmitter/receiver pairs. That is, if an object obstructs the transmission between any receiver 110a-f and transmitter 108a-f of a pair, it may be inferred that an object is detected within the vicinity of the vehicle opening.

As shown in FIG. 5, of the plurality of transmitters 108a-f within the object detection system 106 and a subset of the transmitters 108a-f of the plurality of transmitter/receiver pairs may be affixed to the first door 102 and the remaining transmitters 108a-f of the plurality of transmitter/receiver pairs may be affixed to the second door 104. Similarly, of the plurality of receivers 110a-f within the object detection system 106, a subset of the receivers 110a-f of the plurality of transmitter/receiver pairs may be affixed to the first door 102 and the remaining receivers 110a-f of the plurality of transmitter/receiver pairs may be affixed to the second door 104. In other words, the transmitters 108a-f may not all be affixed to the same door as each other. This can improve the accuracy of determining whether an object is within the vicinity of the opening and/or determining the operating parameter(s) because local environmental effects affecting one door can be "averaged out". For example, if the vehicle 100 is parked over a steam drain and the steam is closer to the second door 104 than the first door 102, any measurements taken by the receivers 110a-f on the second door 104 may be averaged out by the measurements taken by the receivers 110a-f on the first door 102 (or perhaps even ignored completely if the measurements differ so greatly by the other receivers 110a-f on the first door). FIG. 5 shows a particular arrangement in which the receivers 110a-f and transmitters 108a-f alternate along the doors 102, 104. Other arrangements are contemplated, in which a subset of the transmitters 108a-f of the plurality of transmitter/receiver pairs are affixed to the first door 102 and the remaining transmitters 108a-f of the plurality of transmitter/receiver pairs are affixed to the second door 104.

In examples, two or more transmitter/receiver pairs may be used to determine the characteristic of the environment. For example, if all of the transmitter/receiver pairs are operational, all of the transmitter/receiver pairs may be used to determine the characteristic of the environment. The characteristic of the environment may be background electromagnetic radiation and each receiver 110a-f of the plurality of transmitter/receiver pairs may be configured to detect the background electromagnetic radiation. As such, the processor 114 may be configured to: receive, from each receiver 110a-f, a signal indicative of an intensity of the background electromagnetic radiation detected by the receiver 110a-f, and determine the characteristic of the environment based on all of the signals detected by the receivers 110a-f. For example, an average of the background electromagnetic radiation may be determined based on the signals. This process may be more accurate because it can account for any localized conditions that might affect some receivers, but not others (shadows, mud splatters, etc.). In some examples, the processor 114 may further determine an operating parameter of at least one of the transmitter and the receiver for all of the plurality of transmitter/receiver pairs. For example, the processor 114 may determine an operating parameter of at least one of the transmitter and the receiver based on background electromagnetic radiation detected by all of the receivers of the plurality of transmitter/receiver pairs. As such, each transmitter 108a-f may operate according to the determined operating parameter for the transmitters 108a-f and/or each receiver 110a-f may operate according to the determined operating parameter for the receivers 110a-f. "Based on background electromagnetic radiation detected by all of the receivers of the plurality of transmitter/receiver pairs" may mean "based on an average background electromagnetic radiation determined from the background electromagnetic radiation detected by all of the receivers of the plurality of transmitter/receiver pairs.

In another example, each transmitter and/or receiver within a transmitter/receiver pair may be calibrated individually. That is, each receiver 110a-f may be configured to detect background electromagnetic radiation which is then used to determine an operating parameter of the receiver and/or transmitter for that transmitter/receiver pair.

As such, each receiver 110a-f may be configured to detect background electromagnetic radiation and the processor 114 may be configured to: receive, from each receiver 110a-f, a signal indicative of an intensity of the background electromagnetic radiation detected by the receiver 110a-f, and determine a plurality of characteristics of the environment based on the signals detected by the receivers 110a-f. Accordingly, for each transmitter/receiver pair, an operating parameter of at least one of the transmitter and the receiver may be determined based on a characteristic of the environment in which the vehicle is currently located, the characteristic of the environment being background electromagnetic radiation detected by the receiver of the transmitter/receiver pair. Thus, in some examples, an operating parameter of one transmitter may differ from the operating parameter of another transmitter and/or an operating parameter of one receiver may differ from the operating parameter of another receiver. Calibrating each pair individually may accommodate for localized environmental effects, such as dust. In some examples, if a determined operating parameter of one transmitter or receiver is found to differ greatly from operating parameters of other transmitters or receivers, then the operating parameter may be discarded in favour of a more appropriate/sensible operating parameter. That is, if a determined operating parameter differs by an amount greater than a threshold, the operating parameter may be ignored.

Figure 6:
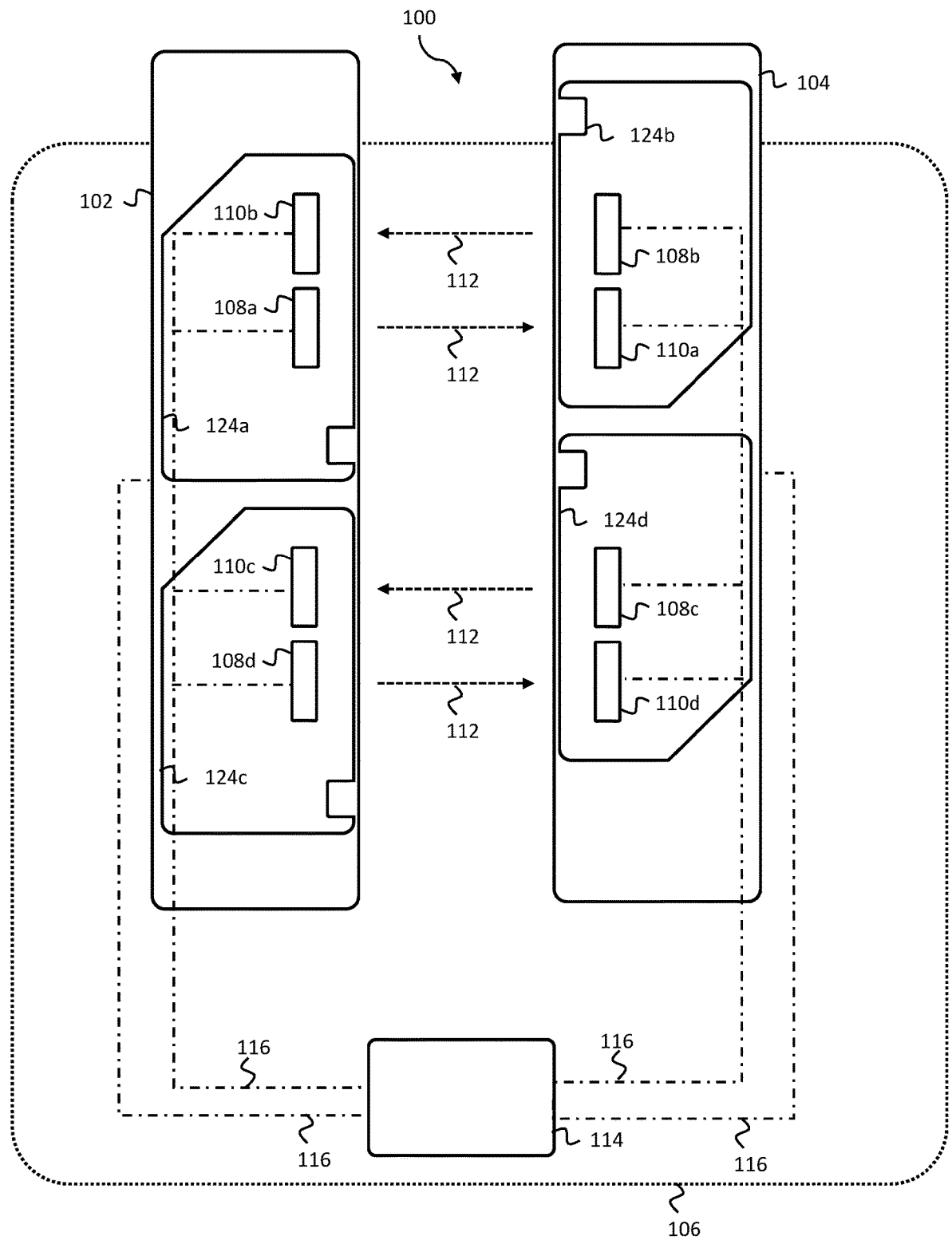
FIG. 6 is a block diagram of an object detection system of a vehicle comprising a plurality of transmitter/receiver pairs across separate circuit boards according to an example.

In examples, the transmitters and receivers on a particular door may be located on one or more printed circuit boards. In a particular configuration, to achieve the alternating arrangement shown in FIG. 5, the circuit board(s) in the first door 102 may be identical to those used in the second door 104, but may be inverted with respect to those in the first door. This avoids having to construct/purchase/manufacture different circuit boards for each door. As such, the same circuit board design can be used in both doors. FIG. 6 shows an arrangement in which a first transmitter 108a is arranged on a first circuit board 124a and a first receiver 110a is located on a second circuit board 124b. The first circuit board 124a further comprises a second receiver 110b and the second circuit board 124b further comprises a second transmitter 108b. In this example the first door 102 therefore comprises the first circuit board 124a and the second door 104 comprises the second circuit board 124b. The first transmitter 108a is configured to emit electromagnetic radiation 112 across the opening towards the first receiver 110a and the second transmitter 108b is configured to emit electromagnetic radiation 112 across the opening towards the second receiver 110b. The first transmitter 108a and the first receiver 110a form a first transmitter/receiver pair and the second transmitter 108b and the second receiver 110b form a second transmitter/receiver pair. As shown, the first and second circuit boards 124a, 124b are inverted with respect to each other such that the electromagnetic radiation 112 emitted by first transmitter 108a is receivable by the first receiver 110a and the electromagnetic radiation 112 emitted by second transmitter 108b is receivable by the second receiver 110b. FIG. 6 further shows a third circuit board 124c within the first door 102 and a fourth circuit board 124d within the second door 104. The third circuit board 124c comprises a third transmitter 108c and a fourth receiver 110d and the fourth circuit board 124d comprises a third receiver 110c and a fourth transmitter 108d. The circuit boards 124a-d in this example have an even number of alternating transmitters and receivers (that is receivers plus transmitters) so that the circuit boards in each door may all be arranged in the same orientation while still providing the alternating receiver/transmitter arrangement along each door.

In examples, inverted may mean that the circuit boards are rotated by 180 degrees with respect to each other. In the example of FIG. 6, the first and second circuit boards are identical and therefore have the same design.

In examples, the processor 114 may perform a test operation to determine whether any of the transmitter/receiver pairs are faulty. If faulty pairs are found, these can be "switched off" so that the pair is no longer used in determining the characteristic of the environment and/or determining whether an object is detected. Alternatively, if any data is still being measured by the receiver of the faulty pair, the data may be "ignored".

To perform a test operation, the transmitters of each pair may be caused to emit electromagnetic radiation towards its corresponding receiver. If the receiver detects electromagnetic radiation emitted by the transmitter or detects a sufficient intensity of electromagnetic radiation emitted by the transmitter, it may be assumed or otherwise determined that the pair is functioning correctly (i.e., is operational). Conversely, if the receiver fails to detect electromagnetic radiation emitted by the transmitter or detects an insufficient intensity of electromagnetic radiation emitted by the transmitter, it may be assumed or otherwise determined that the pair is not functioning correctly (i.e., is faulty).

In an example, it may be determined that one or more transmitter/receiver pairs are operational and one or more transmitter/receiver pairs are faulty. Based on this, the processor 114 may cause the faulty pair(s) to be isolated (that is, either switched off or any data from the faulty pairs is ignored). For example, the processor 114 may determine that the object is within the vicinity of the opening using transmitter/receiver pairs that are operational. For example, the processor 114 may determine that the transmission is at least partially obstructed using pairs that are operational. This can improve the likelihood of correctly determining when an object is obstructing the transmission. Similarly, the processor 114 may determine the characteristic of the environment using receivers of transmitter/receiver pairs that are operational. This can improve the accuracy of measuring the characteristic of the environment.

In examples, the test operation may be performed when the door(s) are located in the closed position. Performing the test operation in the closed position may reduce the likelihood of an object being between the transmitter and receiver, so that a reduction or absence of detected electromagnetic radiation is more likely due to a fault with the transmitter and/or receiver, rather than being blocked by an object. Also, in the closed position, ambient light or other external conditions may not be present. This therefore improves the accuracy and effectiveness of the test operation.

Figure 7:
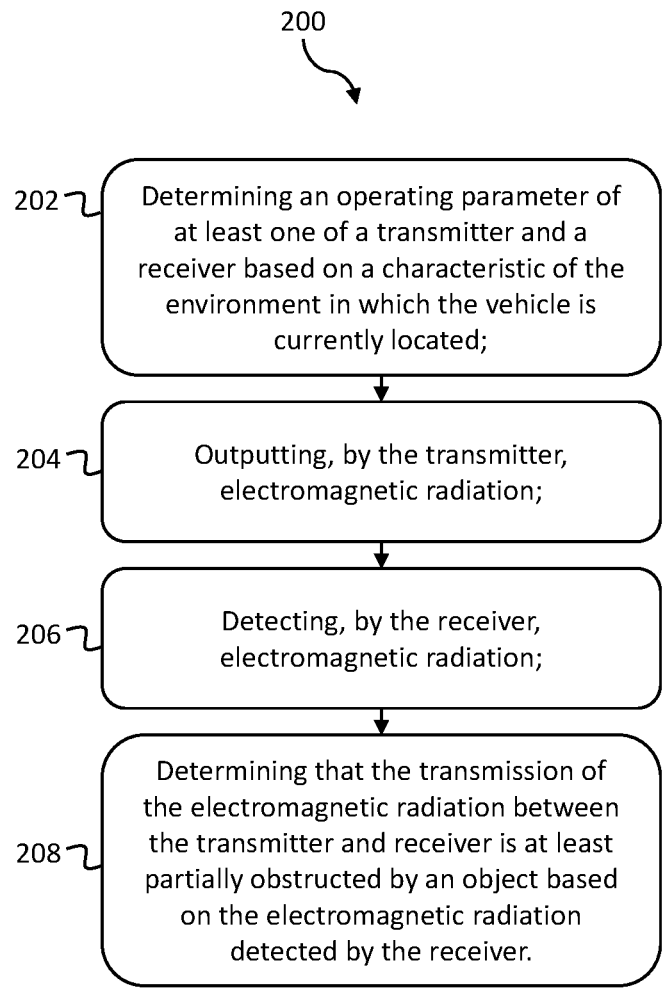
FIG. 7 depicts a flow chart of a method according to a first example.

FIG. 7 illustrates a flow chart of an example method 200. The example method 200 may be implemented by one or more components of the vehicle 100. In one example, the method 200 may be encoded and stored as instructions on one or more non-transitory computer-readable media that, when executed by one or more processors 114 of the vehicle 100, cause the vehicle 100 to implement the method 200. In examples, the method steps may be performed by the at least one processor 114.

As can be seen in FIG. 7, the method/process 200 may comprise, at step 202, determining an operating parameter of at least one of a transmitter 108 and a receiver 110 based on a characteristic of the environment in which the vehicle 100 is currently located, the transmitter 108 being configured to emit electromagnetic radiation 112 across an opening of the vehicle 100 towards the receiver 110. At step 204, the method may comprise outputting, by the transmitter 108, electromagnetic radiation 112 with an intensity associated with the operating parameter of the transmitter 108. At step 206, the method may comprise detecting, by the receiver 110, electromagnetic radiation, wherein the detected electromagnetic radiation is based on the operating parameter of the receiver 110. At step 208, the method may comprise determining that the transmission of the electromagnetic radiation between the transmitter 108 and receiver 110 is at least partially obstructed by an object 118 based on the electromagnetic radiation detected by the receiver 110, thereby determining that the object 118 is within the vicinity of the opening of the vehicle 100.

In examples, prior to step 202 the method may comprise detecting, by the receiver 110, background electromagnetic radiation. As such, step 202 may therefore comprise determining an operating parameter of at least one of a transmitter 108 and a receiver 110 based on the detected background electromagnetic radiation.

Figure 8:
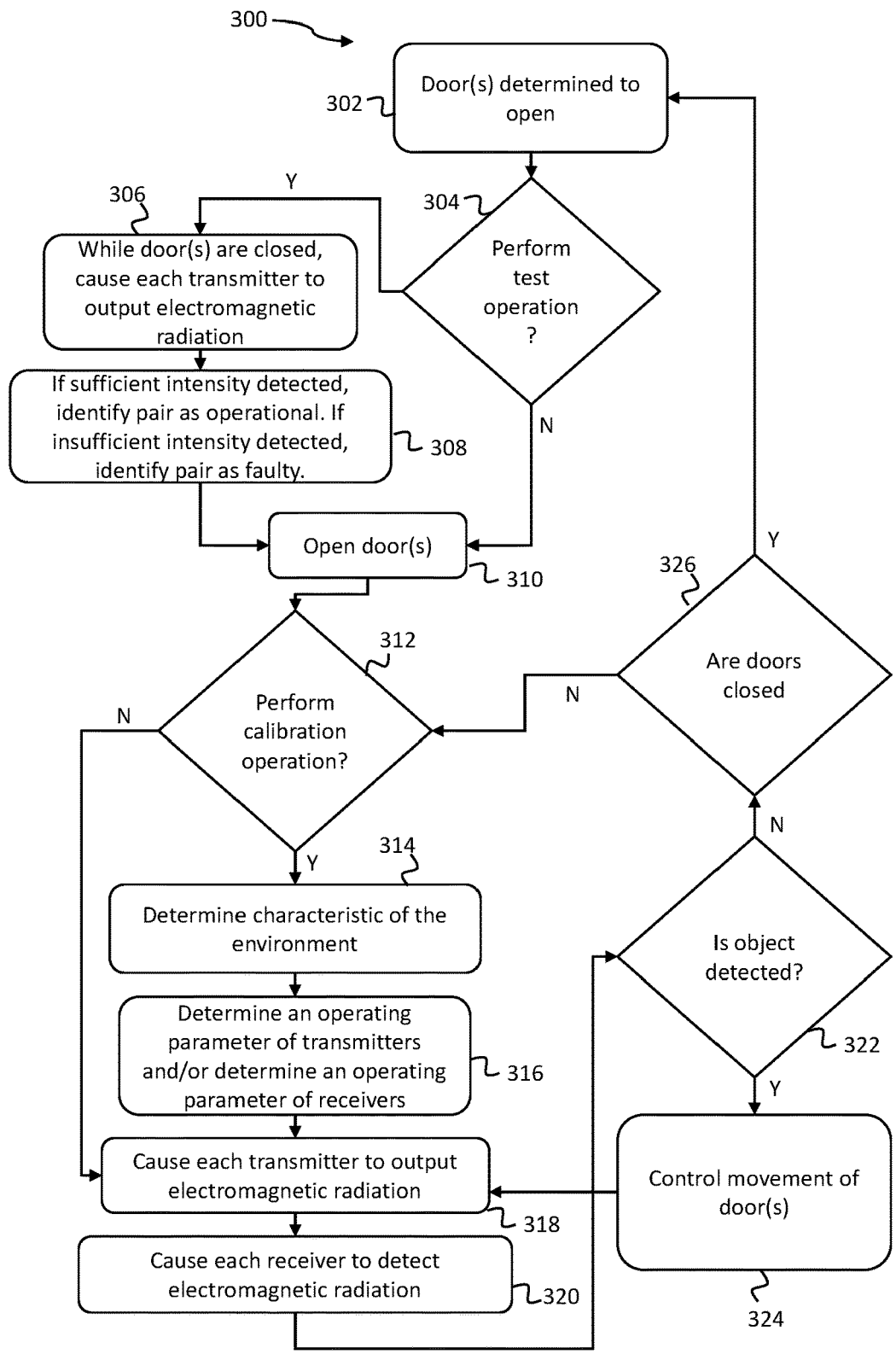
FIG. 8 depicts a flow chart of a method according to a second example.

FIG. 8 depicts a further method/process 300. The example method 300 may be implemented by one or more components of the vehicle 100. In one example, the method 300 may be encoded and stored as instructions on one or more non-transitory computer-readable media that, when executed by one or more processors 114 of the vehicle 100, cause the vehicle 100 to implement the method 300. In examples, the method steps may be performed by the at least one processor 114.

As can be seen in FIG. 8, the method/process 300 may comprise, at step 302, the processor 114 determining that the door(s) are to open. For example, the vehicle 100 may have arrived at a location to pick up a user 118 of the vehicle 100, and upon arriving at the location, the door(s) are to open to allow entry into the vehicle 100 via the opening that is currently closed by the door(s). As such, method 300 may be performed after each time the doors are determined to be opened.

Before causing the door(s) to open, the method 300 may comprise, at step 304, determining whether a test operation is to be performed. In some examples the method 300 does not comprise a test operation so the method may move from step 302 to step 312.

As discussed above, a test operation may be performed to determine whether the transmitter/receiver pairs of a plurality of transmitter/receiver pairs are operational or faulty. The test operation may also be performed in example vehicles where there is a single transmitter and/receiver pair.

If it is determined, in step 304 that a test operation is to be performed, the method may further comprise, in step 306, causing each transmitter of the pair to output electromagnetic radiation towards the transmitters corresponding receiver. In examples comprising a plurality of transmitter/receiver pairs, it will be appreciated that step 306 may be performed for each transmitter at different points in time (i.e., by time-multiplexing the output of electromagnetic radiation) to avoid interference. In other examples, however, step 306 may be performed at the same time for each transmitter.

After step 306, the method may further comprise, in step 308, for each transmitter/receiver pair, one of: (i) determining that the transmitter/receiver pair is operational based at least in part on the receiver of the transmitter/receiver pair detecting electromagnetic radiation emitted by the transmitter of the transmitter/receiver pair or detecting a sufficient intensity of electromagnetic radiation emitted by the transmitter of the transmitter/receiver pair, or (ii) determining that the transmitter/receiver pair is faulty based at least in part on a receiver of the transmitter/receiver pair failing to detect electromagnetic radiation emitted by the transmitter of the transmitter/receiver pair or failing to detect a sufficient intensity of electromagnetic radiation emitted by the transmitter of the transmitter/receiver pair. Each transmitter/receiver pair may then either determined to be operational or faulty. Faulty transmitter/receiver pairs may then be isolated and not used for the remaining method steps.

As discussed, the test operation (including steps 306 and 308) may be performed when the door(s) are in the closed position. In other examples however, the test operation may be performed after step 310 has been performed. In examples, the test operation may always be performed such that step 304 may be removed from the method 300.

The method 300 may further comprise, in step 310, causing the door(s) to open. The door(s) therefore move from the closed position to the open position.

In step 312, the method 300 may further comprise determining whether to perform a calibration operation. During the calibration operation (which includes steps 314 and 316), operating parameter(s) of the transmitter and/or receiver are determined. Accordingly, if it is determined that a calibration operation is to be performed, the method 300 may comprise, in step 314, determining a characteristic of the environment in which the vehicle 100 is currently located. In examples, this may comprise, causing each receiver of the transmitter/receiver pairs to detect background electromagnetic radiation. In step 316, the method 300 may further comprise determining an operating parameter of the transmitter(s) and/or determining an operating parameter of the receiver(s). In examples, this may comprise determining the operating parameter(s) based on background electromagnetic radiation detected by all of the receivers of the plurality of transmitter/receiver pairs (such as those that are operational). In examples, step 316 may comprise updating/adjusting the operating parameter(s) of the transmitters and/or receivers. The transmitters and/or receivers may now be calibrated for the environment in which the vehicle 100 is located.

In examples, the calibration operation steps may be performed when the door(s) are in the open position. In other examples, the calibration operation steps may be performed while the door(s) are moving towards the open position, or while the door(s) are moving and while the door(s) are in the open position.

In examples, the calibration operation may always be performed such that step 312 may be removed from the method 300. The decision whether to perform the calibration operation in step 312 may be based on the time passed since the last time the calibration operation was performed. For example, if the calibration operation has been performed within the last hour, the decision may be to not perform the calibration operation.

After the calibration operation has ended, the method 300 may comprise outputting, by each transmitter, electromagnetic radiation in step 318. In examples comprising a plurality of transmitter/receiver pairs, it will be appreciated that step 318 may be performed for each transmitter at different points in time (i.e., by time-multiplexing the output of electromagnetic radiation) to avoid interference. In other examples, however, step 318 may be performed at the same time for each transmitter.

In step 320, the method may further comprise receiving/detecting, by each receiver, electromagnetic radiation. As discussed earlier, depending upon whether the transmitted electromagnetic radiation is obstructed by an object, the electromagnetic radiation detected the receiver(s) may be a combination of background electromagnetic radiation and that transmitted by the transmitter(s).

In step 322, the method may further comprise determining whether the transmission of the electromagnetic radiation between the transmitter and receiver of the transmitter pair is at least partially obstructed by an object based on the electromagnetic radiation detected by the receiver in step 318.

If it is determined that an object obstructs the electromagnetic radiation, it may be determined that an object is within the vicinity of the opening. In such a case, the method may proceed to step 324, which may comprise controlling movement of the door(s) based on the determination that the electromagnetic radiation is being obstructed. For example, if the door(s) are currently in the open position they may remain or be caused to remain in the open position. If the door(s) are currently closing (i.e., moving from the open position to the closed position), they may be caused to move back to the open position so as not to close on the object. As discussed, an object may be detected if any of the transmitter/receiver pairs are obstructed by the object (that is, those transmitter pairs that have been determined to be operational). After step 324, the method returns to step 318. In examples, the method may return to step 320 if the transmitter(s) is/are already outputting electromagnetic radiation.

If it is determined that the electromagnetic radiation is not obstructed in step 322, the method proceeds to step 326 where it is determined if the door(s) is/are closed (for example, at any point in time between steps 310 and 326, the door(s) may be caused to close). If the doors are still open (i.e., not in the closed position), the method may return to step 312 or 314. This allows the characteristic of the environment (and therefore operating parameter(s)) to be determined again, which may be useful if the environmental characteristics are changing rapidly. Accordingly, the processor 114 may determine an operating parameter of at least one of the transmitter 110 and the receiver 108 each time the transmitter 110 is caused to output electromagnetic radiation for the purposes of detecting an object (i.e., as part of step 318). More generally, a plurality of calibration operations may be performed each time the doors are opened. That is, the processor 114 may determine an operating parameter of at least one of the transmitter 110 and the receiver 108 a plurality of times during each door opening and closing operation.

Alternatively, the method may return to step 318. This ensures that the check to determine whether an object is located within the vicinity of the opening is repeated until the door(s) are in the closed position. In other examples, the method may return to step 320 if the transmitter(s) is/are already outputting electromagnetic radiation.

If, in step 326 it is determined that the door(s) is/are closed, the method returns to step 302. In some examples, the test operation and/or the calibration operation may not be performed if they have been performed within a predetermined period of time. For example, if the test operation was performed within the last hour or last day or last week, it may be assumed that no further transmitter/receiver pairs have become faulty. Similarly, if the calibration operation was performed within the last few minutes, it may be assumed that the characteristic of the environment remains unchanged from the last calibration operation.

In a further example, a calibration operation (comprising steps 314 and 316) may be performed during the test operation. For example, steps corresponding to 314 and 316 (and possibly 312) may further be introduced into FIG. 8 prior to step 306 and after step 304. This process may be useful to reduce the transmitter power level to save energy, for example.

Figure 9:
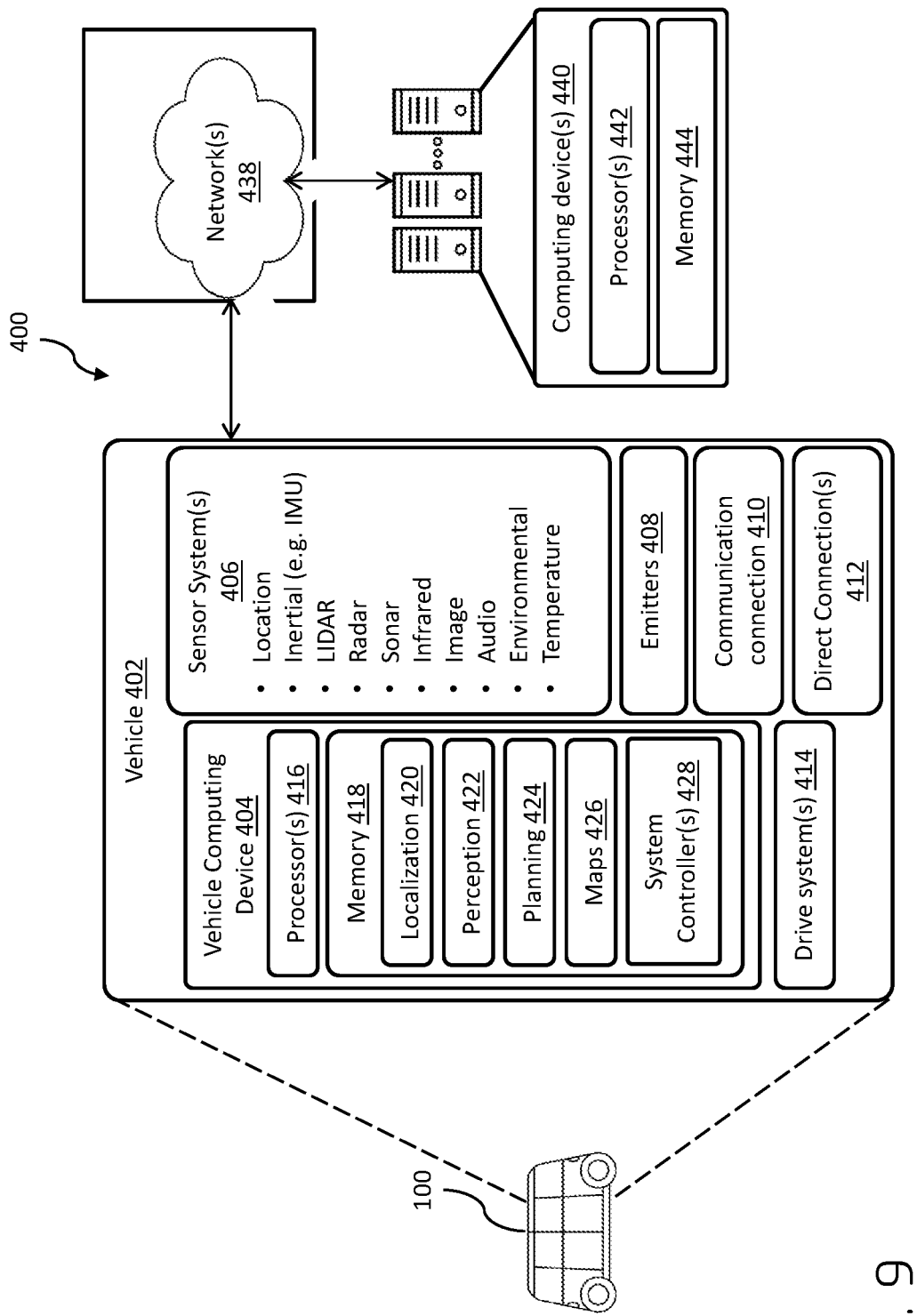
FIG. 9 is a block diagram of an example vehicle system.

FIG. 9 depicts a block diagram of an example system 400 for implementing the techniques described here. In some instances, the system 400 may include a vehicle 402, which may correspond to the vehicle 100 discussed in respect of FIGS. 1-8. In some instances, the vehicle 100 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 100 may be a fully or partially autonomous vehicle having any other level or classification. Moreover, in some instances, the techniques described herein may be usable by non-autonomous vehicles as well.

The vehicle 100 can include vehicle computing device(s) 404, one or more sensor systems 406, one or more emitters 408, one or more communication connections 410, at least one direct connection 412 (e.g., for physically coupling the vehicle 100 to exchange data and/or to provide power), and one or more drive systems 414.

In some instances, the sensor(s) 406 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 406 may include multiple instances of each of these or other types of sensors. For instance, the LIDAR sensors may include individual LIDAR sensors located at the corners, front, back, sides, and/or top of the vehicle 100. As another example, the cameras may include multiple cameras disposed at various locations about the exterior and/or interior of the vehicle 100. The sensor(s) 406 may provide input to the vehicle computing device(s) 404.

The vehicle 100 may also include the emitter(s) 408 for emitting light and/or sound. The emitter(s) 408 in this example may include interior audio and visual emitter(s) to communicate with passengers of the vehicle 100. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 100 may also include the communication connection(s) 410 that enable communication between the vehicle 100 and one or more other local or remote computing device(s). For instance, the communication connection(s) 410 may facilitate communication with other local computing device(s) on the vehicle 100 and/or the drive system(s) 414. Also, the communication connection(s) 410 may additionally or alternatively allow the vehicle 100 to communicate with other nearby computing device(s) (e.g., other nearby vehicles, traffic signals, etc.). The communication connection(s) 410 may additionally or alternatively enable the vehicle 100 to communicate with a computing device 440, which may be a remote computing device 440, such as a server.

The vehicle computing device(s) 404 can include one or more processors 416 and memory 418 communicatively coupled with the one or more processors 416. The one or more processors 416 may correspond to the one of more processors 114 described in relation to FIGS. 1-8, for example. In the illustrated example, the memory 418 of the vehicle computing device(s) 404 stores a localization component 420 perception component 422, a planning component 424, one or more maps 426, and one or more system controllers 428. Though depicted in FIG. 9 as residing in memory 418 for illustrative purposes, it is contemplated that the localization component 420, the perception component 422, the planning component 424, the one or more maps 426, and the one or more system controllers 428 may additionally, or alternatively, be accessible to the vehicle 100 (e.g., stored remotely).

In some instances, the localization component 420 may be configured to receive data from the sensor system(s) 406 to determine a position and/or orientation of the vehicle 100 (e.g., one or more of an x-, y-, z-position, roll, pitch, or yaw). For example, the localization component 420 may include and/or request/receive a map 426 of an environment and may continuously determine a location and/or orientation of the autonomous vehicle within the map 426.

In some instances, the perception component 422 can include functionality to perform object detection, segmentation, and/or classification. In some examples, the perception component 422 can provide processed sensor data that indicates a presence of an entity that is proximate to the vehicle 100 and/or a classification of the entity as an entity type (e.g., car, pedestrian, cyclist, animal, building, tree, road surface, curb, sidewalk, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 424 may determine a location of a user based on image data of an environment received from the user using, for example, bags of binary words with image-based features, artificial neural network, and the like. Further, the planning component 424 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 100 may stop to pick up a passenger. In at least one example, the planning component 424 may determine a pickup location based at least in part on determining a user identity (e.g., determined via image recognition or received as an indication from a user device, as discussed herein).

In some instances, the one or more maps 426 may be used by the vehicle 100 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 426 may be stored based on, for example, a characteristic (e.g., type of entity, time of day, day of week, season of the year, etc.). Storing multiple maps 426 may have similar memory requirements, but increase the speed at which data in a map may be accessed.

In some instances, the vehicle computing device(s) 404 can perform the methods 200 and 300 of FIGS. 7 and 8, utilizing one or more components of the vehicle 402.

In at least one example, the vehicle computing device(s) 404 can include one or more system controllers 428. The system controller 428 can be configured to control steering, propulsion, braking, safety, emitters, communication, and other systems of the vehicle 100. The system controller(s) 428 can communicate with and/or control corresponding systems of the drive system(s) 414 and/or other components of the vehicle 100. The system controller(s) 428 may be communicatively coupled to one or more sensors of the vehicle sensor system(s) 406.

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In some examples, the vehicle 402 can send operational data, including raw or processed sensor data from the sensor system(s) 406, to one or more computing device(s) 440 via the network(s) 438. The one or more computing device(s) 440 may comprise one or more processors 442 and memory 444. The one or more computing devices 440 may be remote from the vehicle.

In some instances, aspects of some or all of the components discussed herein may include any models, algorithms, and/or machine learning algorithms. For example, the component(s) in the memory 418, 444 may be implemented as a neural network. As can be understood in the context of this disclosure, a neural network can utilize machine learning, which can refer to a broad class of such algorithms in which an output is generated based on learned parameters.

Example Clauses

1. A vehicle, comprising:
a first door and a second door, the first and second doors being configured to move along non-linear paths relative to an opening of the vehicle to at least partially close the opening, wherein the first and second doors are moveable to opposite sides of the opening; and
an object detection system, comprising:
a transmitter affixed to the first door and configured to emit electromagnetic radiation across the opening;
a receiver affixed to the second door and configured to detect electromagnetic radiation emitted by the transmitter; and
at least one processor communicatively coupled to the transmitter and receiver, the at least one processor configured to:
(i) based on a characteristic of the environment in which the vehicle is currently located, determine an operating parameter of at least one of the transmitter and the receiver;
cause the transmitter to output electromagnetic radiation with an intensity associated with the operating parameter of the transmitter;
receive, from the receiver, a signal indicative of the electromagnetic radiation detected by the receiver, wherein the signal is based on the operating parameter of the receiver;
determine that the transmission of the electromagnetic radiation between the transmitter and receiver is at least partially obstructed by an object based at least in part on the signal; and
control movement of the first and second doors based at least in part on the electromagnetic radiation being obstructed.

2. The vehicle of clause 1, wherein the at least one processor is configured to, at least one of:
determine the operating parameter of the transmitter based on the characteristic of the environment, the operating parameter of the transmitter being a power output level, and cause the transmitter to output the electromagnetic radiation with an intensity associated with the power output level; and
determine the operating parameter of the transmitter based on the characteristic of the environment, the operating parameter of the transmitter being a transmitter pulse repetition frequency, and cause the transmitter to output the electromagnetic radiation according to the transmitter pulse repetition frequency.

3. The vehicle of clause 1 or 2, wherein:
the receiver is configured to detect background electromagnetic radiation; and
the at least one processor is configured to:
receive, from the receiver, a second signal indicative of the background electromagnetic radiation detected by the receiver; and
determine the operating parameter of at least one of the transmitter and the receiver based at least in part on the second signal.

4. The vehicle of any preceding clause, wherein the at least one processor is configured to:
perform a door opening and closing operation, in which the first and second doors are caused to open and then close; and at least one of:
determine an operating parameter of at least one of the transmitter and the receiver during each door opening and closing operation;
determine an operating parameter of at least one of the transmitter and the receiver a plurality of times during each door opening and closing operation; and
determine an operating parameter of at least one of the transmitter and the receiver each time the transmitter is caused to output electromagnetic radiation.

5. The vehicle of any preceding clause, wherein:
the transmitter is a first transmitter and the receiver is a first receiver;
the vehicle further comprises a second transmitter and a second receiver;
the first transmitter and the second receiver are arranged on a first circuit board;
the second transmitter and the first receiver are arranged on a second circuit board;
the first door comprises the first circuit board and the second door comprises the second circuit board; and
the first and second circuit boards are inverted with respect to each other such that the electromagnetic radiation emitted by first transmitter is receivable by the first receiver and the electromagnetic radiation emitted by second transmitter is receivable by the second receiver.

6. The vehicle of any preceding clause, wherein:
the transmitter and receiver form a first transmitter/receiver pair of a plurality of transmitter/receiver pairs, each transmitter/receiver pair having a transmitter and corresponding receiver;
the first and second doors are moveable between an open position and a closed position; and
the at least one processor is configured to perform a test operation when the first and second doors are in the closed position, comprising:
determining that at least one transmitter/receiver pair is operational based at least in part on a receiver of the transmitter/receiver pair detecting electromagnetic radiation emitted by the transmitter of the transmitter/receiver pair or detecting a sufficient intensity of electromagnetic radiation emitted by the transmitter of the transmitter/receiver pair; and
determining that at least one transmitter/receiver pair is faulty based at least in part on a receiver of the transmitter/receiver pair failing to detect electromagnetic radiation emitted by the transmitter of the transmitter/receiver pair or failing to detect a sufficient intensity of electromagnetic radiation emitted by the transmitter of the transmitter/receiver pair.

7. A method for determining that an object is within the vicinity of an opening of a vehicle, wherein the opening is at least partially closable by at least one door of the vehicle, the method comprising:
(i) based on a characteristic of the environment in which the vehicle is currently located, determining an operating parameter of at least one of a transmitter and a receiver, the transmitter being configured to emit electromagnetic radiation across the opening towards the receiver;
(ii) outputting, by the transmitter, electromagnetic radiation with an intensity associated with the operating parameter of the transmitter;
(iii) detecting, by the receiver, electromagnetic radiation, wherein the detected electromagnetic radiation is based on the operating parameter of the receiver; and
(iv) determining that the transmission of the electromagnetic radiation between the transmitter and receiver is at least partially obstructed by an object based on the electromagnetic radiation detected by the receiver, thereby determining that the object is within the vicinity of the opening.

8. The method of clause 7, wherein the method comprises at least one of:
determining the operating parameter of the transmitter based on the characteristic of the environment in which the vehicle is currently located, the operating parameter of the transmitter being a power output level and outputting, by the transmitter, the electromagnetic radiation with an intensity associated with the power output level; and
  determining the operating parameter of the transmitter based on the characteristic of the environment in which the vehicle is currently located, the operating parameter of the transmitter being a transmitter pulse repetition frequency and outputting, by the transmitter, the electromagnetic radiation according to the transmitter pulse repetition frequency.

9. The method of clause 7 or 8, wherein:
the characteristic of the environment is background electromagnetic radiation; and
the method comprises:
  detecting, by the receiver, background electromagnetic radiation; and
  determining an operating parameter of at least one of the transmitter and the receiver based on the detected background electromagnetic radiation.

10. The method of clause 9, wherein:
the operating parameter of the receiver is a receiver frequency response and the operating parameter of the transmitter is a transmitter pulse repetition frequency;
the method further comprising:
determining, based on the background electromagnetic radiation, a first pulse repetition frequency of the background electromagnetic radiation;
operating the receiver according to the receiver frequency response, such that the receiver filters out electromagnetic radiation having the first pulse repetition frequency; and
operating the transmitter according to the transmitter pulse repetition frequency, such that the transmitter outputs electromagnetic radiation having a second pulse repetition frequency, the second pulse repetition frequency not being filtered out by the receiver.

11. The method of clause 10, comprising one of:
determining an operating parameter of at least one of the transmitter and the receiver each time the at least one door of the vehicle is caused to open;
determining an operating parameter of at least one of the transmitter and the receiver a plurality of times each time the at least one door of the vehicle is caused to open; and
determining an operating parameter of at least one of the transmitter and the receiver each time the transmitter outputs electromagnetic radiation.

12. The method of any of clauses 7 to 11, comprising determining that an intensity of electromagnetic radiation detected by the receiver reduces by an amount greater than a threshold level, thereby determining that the transmission of the electromagnetic radiation between the transmitter and receiver is at least partially obstructed by the object, wherein the threshold level is based on the characteristic of the environment.

13. The method of any of clauses 7 to 12, wherein:
the transmitter and receiver form a first transmitter/receiver pair of a plurality of transmitter/receiver pairs, each transmitter/receiver pair having a transmitter and corresponding receiver; and
the method comprises:
for each receiver of the plurality of transmitter/receiver pairs, detecting the background electromagnetic radiation; and
one of:
for each transmitter/receiver pair, determining an operating parameter of at least one of the transmitter and the receiver based on a characteristic of the environment in which the vehicle is currently located, the characteristic of the environment being background electromagnetic radiation detected by the receiver of the transmitter/receiver pair; and
determining an operating parameter of at least one of the transmitters and the receivers based on a characteristic of the environment in which the vehicle is currently located, the characteristic of the environment being background electromagnetic radiation detected by all of the receivers of the plurality of transmitter/receiver pairs.

14. The method of any of clauses 7 to 13, wherein:
the at least one door comprises a first door and a second door, the first and second doors being movable in a non-linear path to close the opening;
the transmitter is affixed to the first door;
the receiver is affixed to the second door; and
the method further comprises controlling relative movement of both the first and second doors such that the transmitter and receiver are aligned while the first and second doors are in motion, thereby allowing the electromagnetic radiation emitted by the transmitter to be received and detected by the receiver.

15. The method of clause 14, comprising:
detecting, by the receiver, electromagnetic radiation while the first and second doors are in motion; and
controlling relative movement of both the first and second doors based on an intensity of the electromagnetic radiation detected by the receiver while the first and second doors are in motion.

16. The method of any of clauses 7 to 15, wherein:
the transmitter and receiver form a first transmitter/receiver pair of a plurality of transmitter/receiver pairs, each transmitter/receiver pair having a transmitter and corresponding receiver; and
the at least one door is moveable between an open position and a closed position; and
  the method further comprises performing a test operation when the at least one door is in the closed position, comprising:
    determining that at least one transmitter/receiver pair is operational; and
    determining that at least one transmitter/receiver pair is faulty.

17. The method of clause 16, comprising:
determining that at least one transmitter/receiver pair is operational based at least in part on a receiver of the transmitter/receiver pair detecting electromagnetic radiation emitted by the transmitter of the transmitter/receiver pair or detecting a sufficient intensity of electromagnetic radiation emitted by the transmitter of the transmitter/receiver pair; and
determining that at least one transmitter/receiver pair is faulty based at least in part on a receiver of the transmitter/receiver pair failing to detect electromagnetic radiation emitted by the transmitter of the transmitter/receiver pair or failing to detect a sufficient intensity of electromagnetic radiation emitted by the transmitter of the transmitter/receiver pair.

18. The method of clause 16 or 17, comprising determining that the object is within the vicinity of the opening using transmitter/receiver pairs that are operational.

19. One or more non-transitory computer-readable media storing instructions that, when executed by one or more processors of a vehicle, cause the vehicle to perform operations comprising:
(i) determining an operating parameter of at least one of a transmitter and a receiver of the vehicle based on a characteristic of the environment in which the vehicle is currently located, the transmitter being configured to emit electromagnetic radiation across an opening of the vehicle towards the receiver, wherein the opening is at least partially closable by at least one door of the vehicle;
(ii) outputting, by the transmitter, electromagnetic radiation with an intensity associated with the operating parameter of the transmitter;
(iii) detecting, by the receiver, electromagnetic radiation, wherein the detected electromagnetic radiation is based on the operating parameter of the receiver; and
(iv) determining that the transmission of the electromagnetic radiation between the transmitter and receiver is at least partially obstructed by an object based on the electromagnetic radiation detected by the receiver.

20. The non-transitory computer-readable media of clause 19, wherein; and
the instructions cause the vehicle to perform operations comprising:
determining the operating parameter of the transmitter based on the characteristic of the environment, the operating parameter of the transmitter being a power output level the power output level; and
outputting, by the transmitter, the electromagnetic radiation with an intensity associated with the power output level.

21. The vehicle of any of clauses 1 to 6, wherein the characteristic is determined based on electromagnetic radiation detected by the receiver prior to the transmission of electromagnetic radiation by the transmitter.

22. The vehicle of any of clauses 1 to 6 or clause 21, wherein the characteristic of the environment in which the vehicle is currently located is determined based on one of:
background electromagnetic radiation detected by the receiver;
a timestamp; or
a location of the vehicle.

23. The vehicle of any of clauses 1 to 6 or clauses 21 to 22, wherein the at least one processor is configured to periodically determine the operating parameter of at least one of the transmitter and receiver based on the characteristic.

24. The vehicle of any of clauses 1 to 6 or clauses 21 to 23, wherein:
the at least one processor is configured to:
control relative movement of both the first and second doors such that the transmitter and receiver are aligned while the first and second doors are in motion, thereby allowing the electromagnetic radiation emitted by the transmitter to be received and detected by the receiver.

25. The vehicle of any of clauses 1 to 6 or clauses 21 to 24, wherein:
the transmitter and receiver form a first transmitter/receiver pair of a plurality of transmitter/receiver pairs, each transmitter/receiver pair having a transmitter and corresponding receiver; and
a subset of transmitters of the plurality of transmitter/receiver pairs are affixed to the first door and the remaining transmitters of the plurality of transmitter/receiver pairs are affixed to the second door.

26. The vehicle of any of clauses 1 to 6 or clauses 21 to 25, wherein:
the transmitter and receiver form a first transmitter/receiver pair of a plurality of transmitter/receiver pairs, each transmitter/receiver pair having a transmitter and corresponding receiver; and
determining that the transmission of the electromagnetic radiation between the transmitter and receiver is at least partially obstructed comprises determining that the transmission of the electromagnetic radiation is obstructed between any transmitter and receiver of the plurality of transmitter/receiver pairs.

27. The vehicle of any of clauses 1 to 6 or clauses 21 to 26, wherein:
the characteristic of the environment is background electromagnetic radiation;
the transmitter and receiver form a first transmitter/receiver pair of a plurality of transmitter/receiver pairs, each transmitter/receiver pair having a transmitter and corresponding receiver;
each receiver of the plurality of transmitter/receiver pairs are configured to detect the background electromagnetic radiation; and
the at least one processor is configured to one of:
receive, from each receiver, a signal indicative of an intensity of the background electromagnetic radiation detected by the receiver and for each transmitter/receiver pair, determine an operating parameter of at least one of the transmitter and the receiver based on the signal detected by the receiver of the transmitter/receiver pair; and
receive, from each receiver, a signal indicative of an intensity of the background electromagnetic radiation detected by the receiver and determine an operating parameter of at least one of the transmitters and the receivers for all of the plurality of transmitter/receiver pairs based on the signals.

28. The vehicle of any of clauses 1 to 6 or clauses 21 to 27, wherein the at least one processor is configured to:
determine that an intensity of electromagnetic radiation detected by the receiver reduces by an amount greater than a threshold level, thereby determining that the transmission of the electromagnetic radiation between the transmitter and receiver is at least partially obstructed by the object, wherein the threshold level is based on the characteristic of the environment.

29. The vehicle of clause 6, wherein the at least one processor is configured to:
determine that the transmission of the electromagnetic radiation between the transmitter and receiver is at least partially obstructed for transmitter/receiver pairs that are operational.

30. The vehicle of any of clauses 1 to 6 or clauses 21 to 29, wherein the non-linear paths comprise movement along two or more dimensions between a closed position and an open position.

31. The vehicle of any of clauses 1 to 6 or clauses 21 to 30, wherein the first and second doors are positioned on opposite sides of the opening while in an open position.

32. The vehicle of clause 3, wherein the operating parameter of the receiver is a receiver frequency response and the operating parameter of the transmitter is a transmitter pulse repetition frequency;

the at least one processor is configured to:

determine, based on the second signal, a first pulse repetition frequency of the background electromagnetic signal;

cause the receiver to operate according to the receiver frequency response, such that the receiver filters out electromagnetic radiation having the first pulse repetition frequency; and cause the transmitter to operate according to the transmitter pulse repetition frequency, such that the transmitter outputs electromagnetic radiation having a second pulse repetition frequency, the second pulse repetition frequency not being filtered out by the receiver.

33. The method of any of clauses 7 to 18, the method comprising:

prior to outputting electromagnetic radiation by the transmitter, detecting, by the receiver, electromagnetic radiation, wherein the characteristic of the environment is based on the electromagnetic radiation detected by the receiver prior to the transmission of electromagnetic radiation by the transmitter.

34. The method of any of clauses 7 to 18 or clause 33, wherein:

the transmitter and receiver form a first transmitter/receiver pair of a plurality of transmitter/receiver pairs, each transmitter/receiver pair having a transmitter and corresponding receiver; and determining that the transmission of the electromagnetic radiation between the transmitter and receiver is at least partially obstructed comprises determining that the transmission of the electromagnetic radiation is at least partially obstructed between any transmitter and receiver of the plurality of transmitter/receiver pairs.

35. The method of clause 14, wherein controlling relative movement of both the first and second doors comprises synchronizing the movement of both the first and second doors.

36. The method of clause 35, wherein synchronizing the movement comprises matching the rate of movement of both the first and second doors and a time at which the doors are caused to move.

37. The method of clause 14, wherein the first and second doors are moveable both:

in a direction substantially outwards and away from the opening; and in a direction on a plane that is parallel to a plane defined by the opening.

38. The one or more non-transitory computer-readable media of clause 19 or 20, wherein the instructions cause the vehicle to perform the method of any of clauses 7 to 18 or 33 to 37.

39. An object detection system for a vehicle, comprising:

a transmitter affixed to a first door of a vehicle and configured to emit electromagnetic radiation across an opening of the vehicle;

a receiver affixed to a second door of the vehicle and configured to detect electromagnetic radiation emitted by the transmitter; and at least one processor communicatively coupled to the transmitter and receiver, the at least one processor configured to:

(i) based on a characteristic of the environment in which the vehicle is currently located, determine an operating parameter of at least one of the transmitter and the receiver;

(ii) cause the transmitter to output electromagnetic radiation with an intensity associated with the operating parameter of the transmitter;

(iii) receive, from the receiver, a signal indicative of the electromagnetic radiation detected by the receiver, wherein the signal is based on the operating parameter of the receiver;

(iv) determine that the transmission of the electromagnetic radiation between the transmitter and receiver is at least partially obstructed by an object based at least in part on the signal; and (v) control movement of the first and second doors based at least in part on the electromagnetic radiation being obstructed.

While the example clauses described above are described with respect to one particular implementation, it should be understood that, in the context of this document, the content of the example clauses can also be implemented via a method, device, system, computer-readable medium, and/or another implementation. Additionally, any of example clauses 1-39 may be implemented alone or in combination with any other one or more of the example clauses.

What is claimed is:

1. A vehicle, comprising:

a first door and a second door, the first and second doors being configured to move along non-linear paths relative to an opening of the vehicle to at least partially close the opening, wherein the first and second doors are moveable to opposite sides of the opening; and an object detection system, comprising:

a transmitter affixed to the first door and configured to emit electromagnetic radiation across the opening;

a receiver affixed to the second door and configured to detect electromagnetic radiation emitted by the transmitter; and at least one processor communicatively coupled to the transmitter and receiver, the at least one processor configured to:

(i) based on a characteristic of the environment in which the vehicle is currently located, determine an operating parameter of at least one of the transmitter and the receiver;

(ii) cause the transmitter to output electromagnetic radiation with an intensity associated with the operating parameter of the transmitter;

(iii) receive, from the receiver, a signal indicative of the electromagnetic radiation detected by the receiver, wherein the signal is based on the operating parameter of the receiver;

(iv) determine that the transmission of the electromagnetic radiation between the transmitter and receiver is at least partially obstructed by an object based at least in part on the signal; and (v) control movement of the first and second doors based at least in part on the electromagnetic radiation being obstructed.

2. The vehicle of claim 1, wherein the at least one processor is configured to, at least one of:

determine the operating parameter of the transmitter based on the characteristic of the environment, the operating parameter of the transmitter being a power output level, and cause the transmitter to output the electromagnetic radiation with an intensity associated with the power output level; and
determine the operating parameter of the transmitter based on the characteristic of the environment, the operating parameter of the transmitter being a transmitter pulse repetition frequency, and cause the transmitter to output the electromagnetic radiation according to the transmitter pulse repetition frequency.

3. The vehicle of claim 1, wherein:
the receiver is configured to detect background electromagnetic radiation; and
the at least one processor is configured to:
receive, from the receiver, a second signal indicative of the background electromagnetic radiation detected by the receiver; and
determine the operating parameter of at least one of the transmitter and the receiver based at least in part on the second signal.

4. The vehicle of claim 1, wherein the at least one processor is configured to:
perform a door opening and closing operation, in which the first and second doors are caused to open and then close; and at least one of:
determine an operating parameter of at least one of the transmitter and the receiver during each door opening and closing operation;
determine an operating parameter of at least one of the transmitter and the receiver a plurality of times during each door opening and closing operation; and
determine an operating parameter of at least one of the transmitter and the receiver each time the transmitter is caused to output electromagnetic radiation.

5. The vehicle of claim 1, wherein:
the transmitter is a first transmitter and the receiver is a first receiver;
the vehicle further comprises a second transmitter and a second receiver;
the first transmitter and the second receiver are arranged on a first circuit board;
the second transmitter and the first receiver are arranged on a second circuit board;
the first door comprises the first circuit board and the second door comprises the second circuit board; and
the first and second circuit boards are inverted with respect to each other such that the electromagnetic radiation emitted by first transmitter is receivable by the first receiver and the electromagnetic radiation emitted by second transmitter is receivable by the second receiver.

6. The vehicle of claim 1, wherein:
the transmitter and receiver form a first transmitter/receiver pair of a plurality of transmitter/receiver pairs, each transmitter/receiver pair having a transmitter and corresponding receiver;
the first and second doors are moveable between an open position and a closed position; and
the at least one processor is configured to perform a test operation when the first and second doors are in the closed position, comprising:
determining that at least one transmitter/receiver pair is operational based at least in part on a receiver of the transmitter/receiver pair detecting electromagnetic radiation emitted by the transmitter of the transmitter/receiver pair or detecting a sufficient intensity of electromagnetic radiation emitted by the transmitter of the transmitter/receiver pair; and
determining that at least one transmitter/receiver pair is faulty based at least in part on a receiver of the transmitter/receiver pair failing to detect electromagnetic radiation emitted by the transmitter of the transmitter/receiver pair or failing to detect a sufficient intensity of electromagnetic radiation emitted by the transmitter of the transmitter/receiver pair.

7. A method for determining that an object is within the vicinity of an opening of a vehicle, wherein the opening is at least partially closable by at least one door of the vehicle, the method comprising:
(i) based on a characteristic of the environment in which the vehicle is currently located, determining an operating parameter of at least one of a transmitter and a receiver, the transmitter being configured to emit electromagnetic radiation across the opening towards the receiver;
(ii) outputting, by the transmitter, electromagnetic radiation with an intensity associated with the operating parameter of the transmitter;
(iii) detecting, by the receiver, electromagnetic radiation, wherein the detected electromagnetic radiation is based on the operating parameter of the receiver; and
(iv) determining that the transmission of the electromagnetic radiation between the transmitter and receiver is at least partially obstructed by an object based on the electromagnetic radiation detected by the receiver, thereby determining that the object is within the vicinity of the opening.

8. The method of claim 7, wherein the method comprises at least one of:
determining the operating parameter of the transmitter based on the characteristic of the environment in which the vehicle is currently located, the operating parameter of the transmitter being a power output level and outputting, by the transmitter, the electromagnetic radiation with an intensity associated with the power output level; and
determining the operating parameter of the transmitter based on the characteristic of the environment in which the vehicle is currently located, the operating parameter of the transmitter being a transmitter pulse repetition frequency and outputting, by the transmitter, the electromagnetic radiation according to the transmitter pulse repetition frequency.

9. The method of claim 7, wherein:
the characteristic of the environment is background electromagnetic radiation; and
the method comprises:
detecting, by the receiver, background electromagnetic radiation; and
determining an operating parameter of at least one of the transmitter and the receiver based on the detected background electromagnetic radiation.

10. The method of claim 9, wherein:
the operating parameter of the receiver is a receiver frequency response and the operating parameter of the transmitter is a transmitter pulse repetition frequency;
the method further comprising:
determining, based on the background electromagnetic radiation, a first pulse repetition frequency of the background electromagnetic radiation;
operating the receiver according to the receiver frequency response, such that the receiver filters out electromagnetic radiation having the first pulse repetition frequency; and operating the transmitter according to the transmitter pulse repetition frequency, such that the transmitter outputs electromagnetic radiation having a second pulse repetition frequency, the second pulse repetition frequency not being filtered out by the receiver.

11. The method of claim 7, comprising one of:
determining an operating parameter of at least one of the transmitter and the receiver each time the at least one door of the vehicle is caused to open;
determining an operating parameter of at least one of the transmitter and the receiver a plurality of times each time the at least one door of the vehicle is caused to open; and
determining an operating parameter of at least one of the transmitter and the receiver each time the transmitter outputs electromagnetic radiation.

12. The method of claim 7, comprising determining that an intensity of electromagnetic radiation detected by the receiver reduces by an amount greater than a threshold level, thereby determining that the transmission of the electromagnetic radiation between the transmitter and receiver is at least partially obstructed by the object, wherein the threshold level is based on the characteristic of the environment.

13. The method of claim 7, wherein:
the transmitter and receiver form a first transmitter/receiver pair of a plurality of transmitter/receiver pairs, each transmitter/receiver pair having a transmitter and corresponding receiver; and
the method comprises:
for each receiver of the plurality of transmitter/receiver pairs, detecting the background electromagnetic radiation; and
one of:
for each transmitter/receiver pair, determining an operating parameter of at least one of the transmitter and the receiver based on a characteristic of the environment in which the vehicle is currently located, the characteristic of the environment being background electromagnetic radiation detected by the receiver of the transmitter/receiver pair; and
determining an operating parameter of at least one of the transmitters and the receivers based on a characteristic of the environment in which the vehicle is currently located, the characteristic of the environment being background electromagnetic radiation detected by all of the receivers of the plurality of transmitter/receiver pairs.

14. The method of claim 7, wherein:
the at least one door comprises a first door and a second door, the first and second doors being movable in a non-linear path to close the opening;
the transmitter is affixed to the first door;
the receiver is affixed to the second door; and
the method further comprises controlling relative movement of both the first and second doors such that the transmitter and receiver are aligned while the first and second doors are in motion, thereby allowing the electromagnetic radiation emitted by the transmitter to be received and detected by the receiver.

15. The method of claim 14, comprising:
detecting, by the receiver, electromagnetic radiation while the first and second doors are in motion; and
controlling relative movement of both the first and second doors based on an intensity of the electromagnetic radiation detected by the receiver while the first and second doors are in motion.

16. The method of claim 7, wherein:
the transmitter and receiver form a first transmitter/receiver pair of a plurality of transmitter/receiver pairs, each transmitter/receiver pair having a transmitter and corresponding receiver; and
the at least one door is moveable between an open position and a closed position; and
the method further comprises performing a test operation when the at least one door is in the closed position, comprising:
determining that at least one transmitter/receiver pair is operational; and
determining that at least one transmitter/receiver pair is faulty.

17. The method of claim 16, comprising:
determining that at least one transmitter/receiver pair is operational based at least in part on a receiver of the transmitter/receiver pair detecting electromagnetic radiation emitted by the transmitter of the transmitter/receiver pair or detecting a sufficient intensity of electromagnetic radiation emitted by the transmitter of the transmitter/receiver pair; and
determining that at least one transmitter/receiver pair is faulty based at least in part on a receiver of the transmitter/receiver pair failing to detect electromagnetic radiation emitted by the transmitter of the transmitter/receiver pair or failing to detect a sufficient intensity of electromagnetic radiation emitted by the transmitter of the transmitter/receiver pair.

18. The method of claim 16, comprising determining that the object is within the vicinity of the opening using transmitter/receiver pairs that are operational.

19. One or more non-transitory computer-readable media storing instructions that, when executed by one or more processors of a vehicle, cause the vehicle to perform operations comprising:
(i) determining an operating parameter of at least one of a transmitter and a receiver of the vehicle based on a characteristic of the environment in which the vehicle is currently located, the transmitter being configured to emit electromagnetic radiation across an opening of the vehicle towards the receiver, wherein the opening is at least partially closable by at least one door of the vehicle;
(ii) outputting, by the transmitter, electromagnetic radiation with an intensity associated with the operating parameter of the transmitter;
(iii) detecting, by the receiver, electromagnetic radiation, wherein the detected electromagnetic radiation is based on the operating parameter of the receiver; and
(iv) determining that the transmission of the electromagnetic radiation between the transmitter and receiver is at least partially obstructed by an object based on the electromagnetic radiation detected by the receiver.

20. The non-transitory computer-readable media of claim 19, wherein; and
the instructions cause the vehicle to perform operations comprising:
determining the operating parameter of the transmitter based on the characteristic of the environment, the operating parameter of the transmitter being a power output level the power output level; and
outputting, by the transmitter, the electromagnetic radiation with an intensity associated with the power output level.

* * * * *